US012552332B2

(12) United States Patent
Sato et al.

(10) Patent No.: US 12,552,332 B2
(45) Date of Patent: Feb. 17, 2026

(54) WIRING MODULE AND PANEL WITH WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tatsumi Sato, Osaka (JP); Kosuke Sone, Osaka (JP); Yasuyuki Yamamoto, Osaka (JP); Takuya Taniguchi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 222 days.

(21) Appl. No.: 18/283,732

(22) PCT Filed: Mar. 11, 2022

(86) PCT No.: PCT/JP2022/010841
§ 371 (c)(1),
(2) Date: Sep. 22, 2023

(87) PCT Pub. No.: WO2022/209745
PCT Pub. Date: Oct. 6, 2022

(65) Prior Publication Data
US 2024/0181977 A1 Jun. 6, 2024

(30) Foreign Application Priority Data
Mar. 31, 2021 (JP) ................................. 2021-061038

(51) Int. Cl.
*B60R 16/02* (2006.01)
*H02G 3/04* (2006.01)
*H02G 3/36* (2006.01)

(52) U.S. Cl.
CPC ....... *B60R 16/0207* (2013.01); *H02G 3/0481* (2013.01); *H02G 3/36* (2013.01)

(58) Field of Classification Search
CPC .......... H02G 3/04; H02G 3/0481; H02G 3/36; B60R 16/02; B60R 16/0207;
(Continued)

(56) References Cited

U.S. PATENT DOCUMENTS 4,119,794 A * 10/1978 Matsuki .................. B32B 27/06
296/210
5,309,634 A * 5/1994 Van Order .......... B60R 16/0207
174/72 A
(Continued)

FOREIGN PATENT DOCUMENTS

| JP | 2000-335327 A | 12/2000 |
|----|----|----|
| JP | 2015-104211 A | 6/2015 |
| JP | 2018-090229 A | 6/2018 |

OTHER PUBLICATIONS

International Search Report issued on May 24, 2022 for WO 2022/209745 A1 (4 pages).

*Primary Examiner* — William H. Mayo, III
(74) *Attorney, Agent, or Firm* — Venjuris, P.C.

(57) ABSTRACT

A wiring module disposed in a vehicle in an arrangement space between a vehicle body panel and an interior member includes at least one device; a transmission member extending from each one of the at least one device; and a rigid member including a panel fixing portion and a plurality of device fixing portions. Each one of the at least one device is fixed to a device fixing portion selected from the plurality of device fixing portions, and a portion of the transmission
(Continued)

member extending out from each one of the at least one device is held by the rigid member. The wiring module is fixed to the vehicle body panel via the panel fixing portion.

9 Claims, 18 Drawing Sheets

(58) Field of Classification Search
CPC ........ B60R 16/0215; B60J 5/04; H01R 43/00; H01R 43/04; H01B 7/0045; H01B 13/01281
USPC ......... 296/210, 214, 216.01, 216.04, 216.07, 296/216.09, 216.06, 223, 488, 490, 546; 174/72 A
See application file for complete search history.

(56) References Cited

U.S. PATENT DOCUMENTS

| | | | | |
|---|---|---|---|---|
| 5,649,626 | A * | 7/1997 | Sawamura | B60R 16/0215 206/509 |
| 5,771,575 | A * | 6/1998 | Onizuka | B60K 35/60 174/72 A |
| 5,895,889 | A * | 4/1999 | Uchida | B60R 16/0207 174/72 A |
| 6,582,013 | B1 * | 6/2003 | Inoue | B62D 25/06 296/214 |
| 10,096,399 | B2 * | 10/2018 | Kawaguchi | H02G 3/0487 |
| 10,468,161 | B2 * | 11/2019 | Kominato | H01R 11/288 |
| 2002/0041110 | A1 * | 4/2002 | Odashima | B60J 5/0416 296/146.7 |
| 2017/0327060 | A1 | 11/2017 | Nakajima | |
| 2020/0130613 | A1 * | 4/2020 | Kisu | H01B 13/01263 |

* cited by examiner

WIRING MODULE AND PANEL WITH WIRING MODULE

CROSS REFERENCE TO RELATED APPLICATIONS

This application is a national phase of PCT application No. PCT/JP2022/010841, filed on 11 Mar. 2022, which claims priority from Japanese patent application No. 2021-061038, filed on 31 Mar. 2021, all of which are incorporated herein by reference.

TECHNICAL FIELD

The present disclosure relates to a wiring module and a panel with wiring module.

BACKGROUND

In Patent Document 1, a wire harness assembly disposed between a ceiling of a vehicle and a roof liner is described. In the wire harness assembly according to Patent Document 1, the wire harness for a device disposed on the ceiling is disposed between a soundproofing material and a protective material.

PRIOR ART DOCUMENT

Patent Document

Patent Document 1: JP 2018-090229 A

SUMMARY OF THE INVENTION

Problems to be Solved

There is demand for an increase in design flexibility relating to devices disposed in a vehicle in an arrangement space between a vehicle body panel such as the ceiling and an interior member such as the roof liner.

Regarding this, an object is to provide a technique that can increase the design flexibility relating to devices disposed in a vehicle in an arrangement space between a vehicle body panel and an interior member.

Means to Solve the Problem

A wiring module according to the present disclosure is a wiring module disposed in a vehicle in an arrangement space between a vehicle body panel and an interior member that includes: at least one device; a transmission member extending from each one of the at least one device; and a rigid member including a panel fixing portion and a plurality of device fixing portions, wherein each one of the at least one device is fixed to a device fixing portion selected from the plurality of device fixing portions, a portion of the transmission member extending out from each one of the at least one device is held by the rigid member, and the wiring module is fixed to the vehicle body panel via the panel fixing portion.

Effect of the Invention

According to the present disclosure, the design flexibility relating to devices disposed in a vehicle in an arrangement space between a vehicle body panel and an interior member can be increased.

DETAILED DESCRIPTION TO EXECUTE THE INVENTION

Description of Embodiments of Present Disclosure

Figure 1:
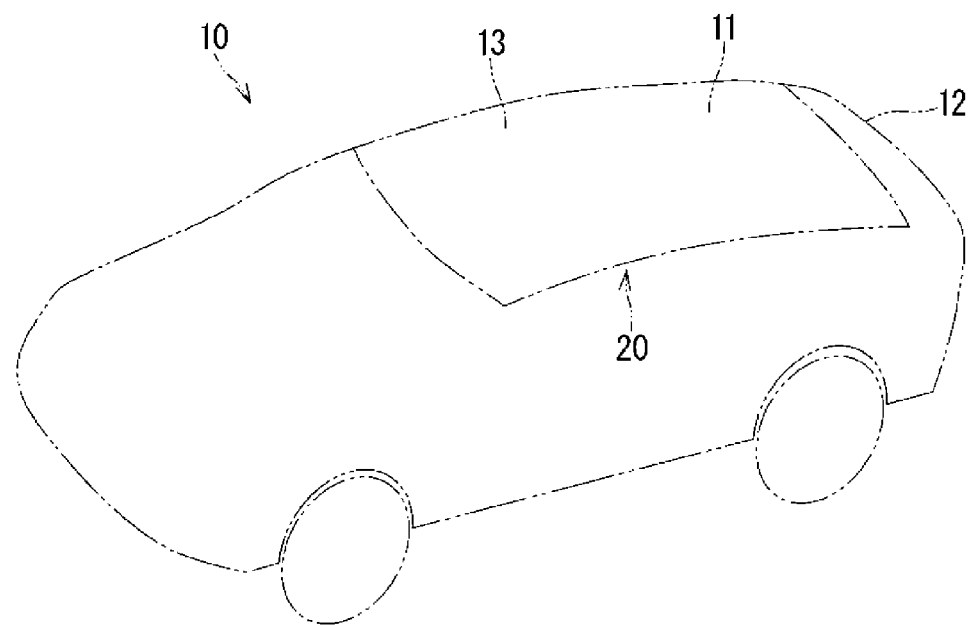
FIG. 1 is a schematic perspective view illustrating a vehicle embedded with a wiring module.

Firstly, embodiments of the present disclosure will be listed and described.

A wiring module of the present disclosure is as follows.

(1) A wiring module disposed in a vehicle in an arrangement space between a vehicle body panel and an interior member includes: at least one device; a transmission member extending from each one of the at least one device; and a rigid member including a panel fixing portion and a plurality of device fixing portions, wherein each one of the at least one device is fixed to a device fixing portion selected from the plurality of device fixing portions, a portion of the transmission member extending out from each one of the at least one device is held by the rigid member, and the wiring module is fixed to the vehicle body panel via the panel fixing portion. Each one of the at least one device is fixed to the device fixing portion selected from the plurality of device fixing portions. Thus, a change to the attachment position of the device, a change to the specifications of the device, an increase to the number of devices, and the like can be easily accommodated for. Also, the rigidity of the vehicle body panel is normally higher than the rigidity of the interior member. Since the wiring module is fixed to the vehicle body panel, even when the weight of the wiring module is increased by an increase in the number of devices or the like, the wiring module can be appropriately supported in the vehicle. Accordingly, the design flexibility relating to devices disposed in the vehicle in an arrangement space between the vehicle body panel and the interior member can be increased.

(2) In the wiring module according to (1), as the plurality of device fixing portions, a plurality of fixing holes may be formed in a surface of the rigid member, and each one of the at least one device may be fixed using a set of fixing holes selected from among the plurality of fixing holes. Accordingly, a change in the fixing position of the device, a change in the size of the device, or the like can be easily accommodated for by changing the set of fixing holes used to secure the device.

(3) In the wiring module according to (1) or (2), the rigid member may include a wiring line holding portion that holds the transmission member, and the wiring line holding portion may include a wiring line housing portion formed as a groove in the surface of the rigid member that houses the transmission member and a projection for stopping the transmission member from coming out from the wiring line housing portion. Accordingly, there is no need to provide a member for holding the transmission member in addition to the rigid member. Also, when changing the devices, the transmission member can be easily attached to and detached from the wiring line holding portion. Furthermore, the transmission members of the plurality of devices are grouped as they extend out from the rigid member through the outlet of the wiring line housing portion, allowing the transmission members of the plurality of devices to be treated as one wiring line group.

(4) In the wiring module according to any one of (1) to (3), the arrangement space may be a space inside a roof between a roof panel, which is the vehicle body panel, and a roof liner, which is the interior member. Accordingly, a change, increase in number, or the like of the devices disposed in the space inside the roof can be easily accommodated for.

(5) In the wiring module according to any one of (1) to (4), a plurality of the rigid members may be provided, and the transmission members extending from the plurality of rigid members may be bundled into one bundle. This makes handling the transmission members extending from the plurality of rigid members easy.

(6) A panel with wiring module of the present disclosure includes: the wiring module according to any one of (1) to (5); and the vehicle body panel, wherein the vehicle body panel includes a receiving portion where the panel fixing portion of the rigid member is fixed and a panel-side wiring line holding portion that holds a portion of the transmission member that extends outside the rigid member. Accordingly, when the wiring module is fixed to the vehicle body panel, the portions of the plurality of transmission members that extend outside of the rigid member can also be fixed to the vehicle body panel.

(7) In the panel with wiring module according to (6), a plurality of the wiring modules, the receiving portions, and the panel-side wiring line holding portions may be provided on the single vehicle body panel, and the transmission members of the plurality of wiring modules may be collectively held by at least one of the plurality of panel-side wiring line holding portions. Accordingly, the transmission members of the plurality of wiring modules can be easily held by one vehicle body panel.

Details of Embodiments of Present Disclosure

Specific examples of a wiring module according to the present disclosure will be described below with reference to the drawings. Note that the present disclosure is not limited to these examples. The present invention is defined by the scope of the claims, and all modifications that are equivalent to or within the scope of the claims are included.

First Embodiment

A wiring module according to the first embodiment will be described below.
<Vehicle Embedded with Wiring Module>
FIG. 1 is a schematic perspective view illustrating an example of a vehicle 10 embedded with a wiring module 20. The vehicle 10 includes a body 12. The body 12 is the portion that defines the external shape of the vehicle 10. The body 12 may be a monocoque body or may be a body installed on a ladder frame. In this example, the body 12 includes a side panel surrounding the vehicle cabin, a roof panel 13, a passenger door panel for occupants to enter or leave, a rear door panel for inserting or removing goods, and the like. The body 12 may be made of metal or may be made of resin. The body 12 may be configured of a combination of metal and resin. The plate-like portion of the body 12 covering the top of the vehicle cabin is the roof panel 13. In other words, the roof panel 13 forms a roof portion 11 of the vehicle 10. The roof panel 13 may partially curved or have an overall curved shape to facilitate forming the shape of the external appearance of the body 12. The roof panel 13 may be made of metal, may be made of resin, or may be configured of a combination of metal and resin.

Figure 2:
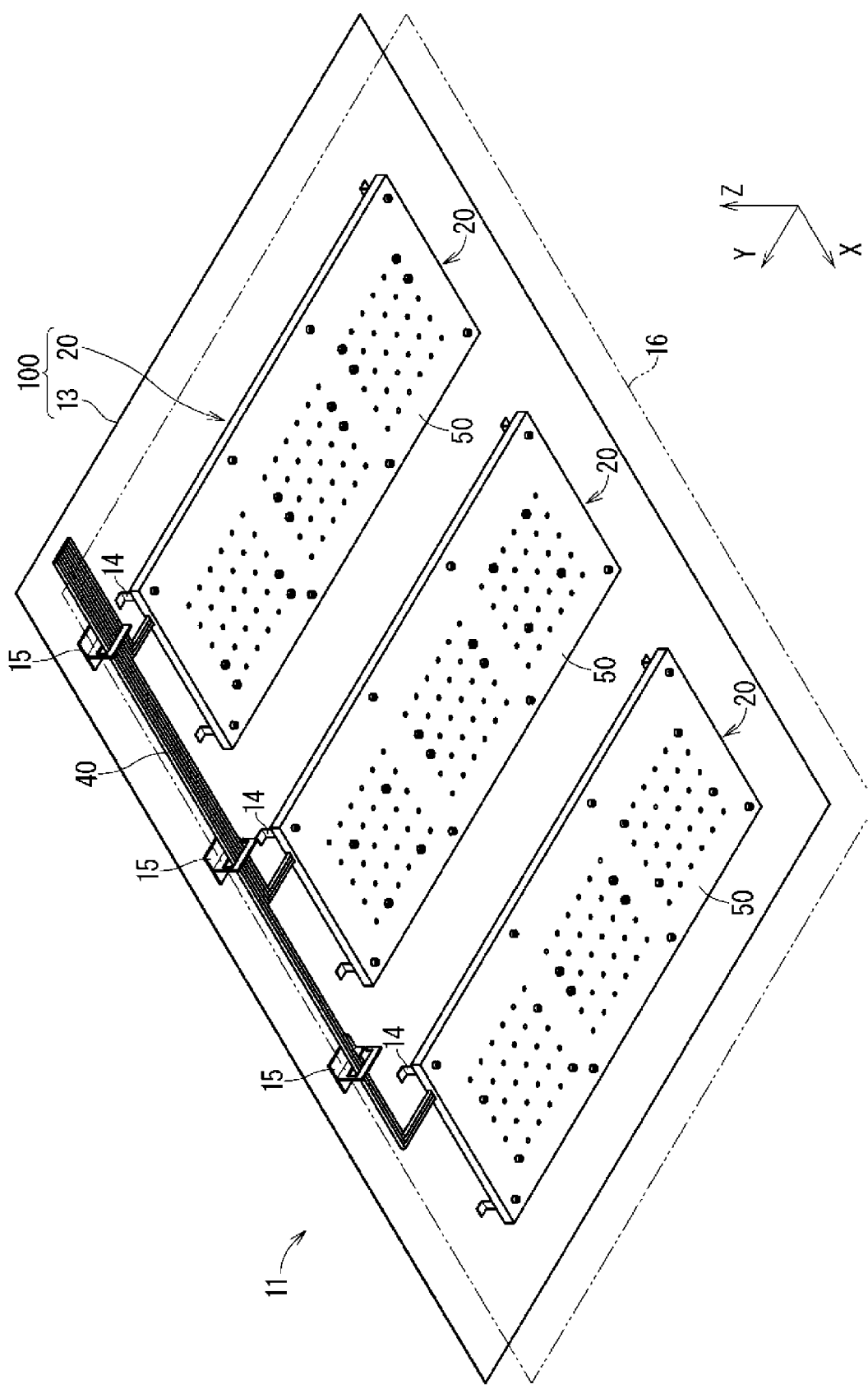
FIG. 2 is a perspective view illustrating the wiring module and a panel with wiring module including the wiring module according to a first embodiment.
Figure 3:
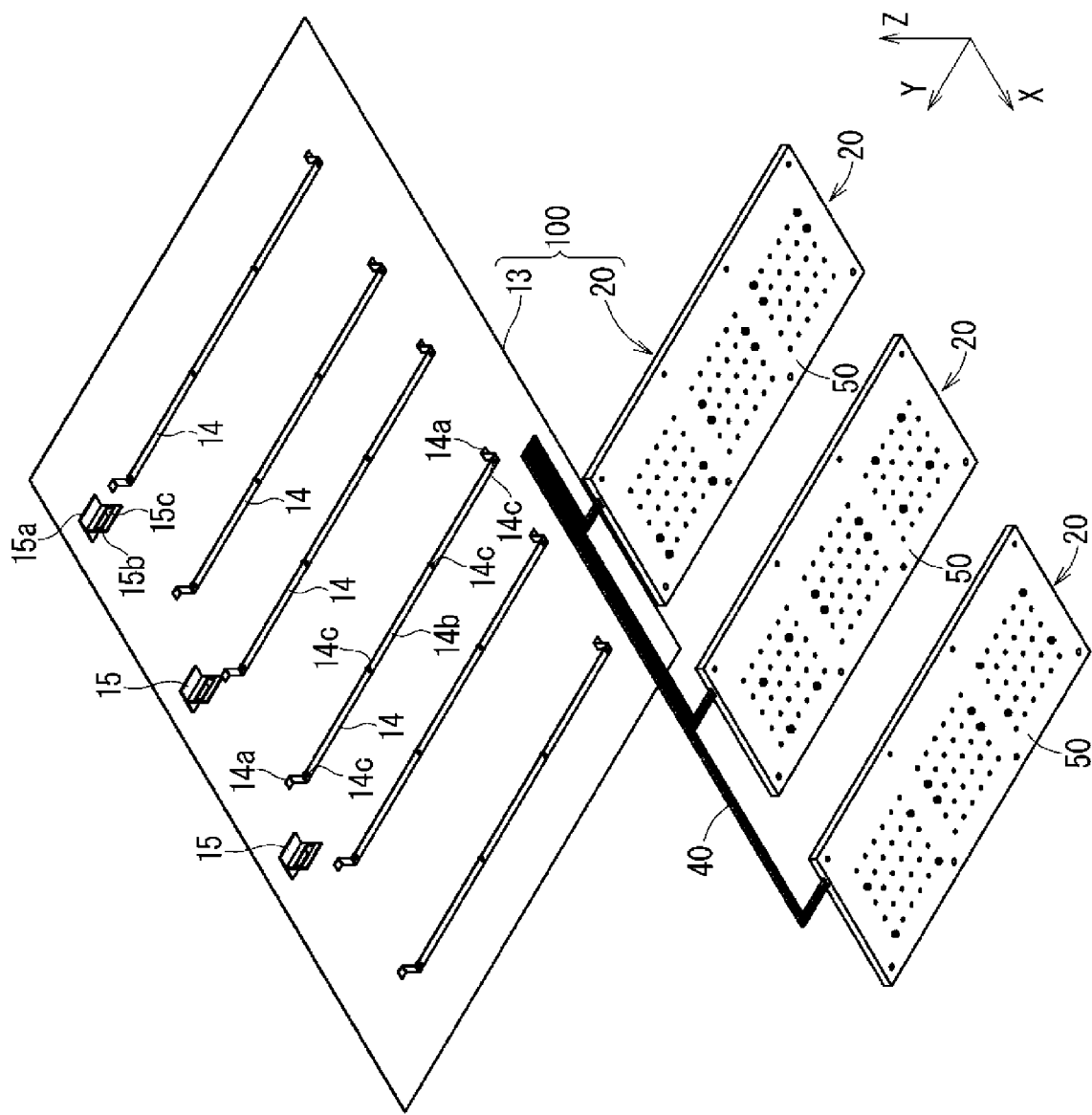
FIG. 3 is an exploded perspective view illustrating the wiring module and the panel with wiring module including the wiring module according to the first embodiment.

FIG. 2 is a perspective view illustrating the wiring module 20 and a panel with wiring module 100 including the wiring module 20 according to the first embodiment. FIG. 3 is an exploded perspective view illustrating the wiring module 20 and the panel with wiring module 100 including the wiring module 20 according to the first embodiment. In FIG. 2, the mutually orthogonal X direction, Y direction, and Z-direction are indicated. In the present disclosure, in a state where the wiring module 20 is disposed in the vehicle 10, the X direction corresponds to the front-and-back direction of the vehicle 10, the Y direction corresponds to the width direction of the vehicle 10, and the Z direction corresponds to the vertical direction. The wiring module 20 is embedded in the vehicle 10. The wiring module 20 is disposed in an arrangement space in the vehicle 10 between a vehicle body panel 13 and an interior member 16. The wiring module 20 is fixed to the vehicle body panel 13 to form the panel with wiring module 100. In the present embodiment described, the wiring module 20 is embedded in the roof portion 11 including the roof panel 13. In other words, in the present embodiment, the arrangement space of the wiring module 20 is the space inside the roof between the roof panel 13, which is the vehicle body panel 13, and a roof liner 16, which is the interior member 16.

In FIG. 2, the roof portion 11 is illustrated. A transmission member 40 illustrated in FIG. 2 indicates a schematic path, and even if only one line is illustrated, the transmission member may include a plurality of electrical wires or the like. As the roof portion 11, the roof panel 13 and the interior member 16 described above are illustrated. A receiving portion 14 and a panel-side wiring line holding portion 15 is provided on the inner surface (down-facing surface) of the roof panel 13. The receiving portion 14 is a member for securing a rigid member 50 of the wiring module 20. The panel-side wiring line holding portion 15 is a member for holding a portion of the transmission member 40 of the wiring module 20 that extends outside the rigid member 50. When the roof panel 13 is metal, the receiving portion 14 and the panel-side wiring line holding portion 15 made of metal may be welded to the inner surface of the roof panel 13. The receiving portion 14 and the panel-side wiring line holding portion 15 may be provided in the vehicle 10 on a reinforcing member (also referred to as a roof reinforcement, a roof stay, and the like) spanning the roof.

In the present embodiment, the receiving portion 14 is an elongated member extending in the width direction of the roof panel 13. The receiving portion 14 may be a bracket provided separate to the reinforcing member referred to as a roof reinforcement, a roof stay, and the like. End portions 14a of the receiving portion 14 in the extension direction are fixed to the inner surface of the roof panel 13 by welding or the like. An intermediate portion 14b in the extension direction of the receiving portion 14 is located lower down than the end portions 14a forming a gap with the roof panel 13. The receiving portion 14 is formed by performing a bending process or the like on an elongated member. The rigid member 50 is fixed to the intermediate portion 14b. For example, a through hole 14c is formed in the intermediate portion 14b. The rigid member 50 is fixed to the receiving portion 14 by inserting a screw S, a clip, or the like into the through hole 14c, for example. The rigid member 50 is suspended and supported on the roof panel 13 by the receiving portion 14. In this example, one rigid member 50 is supported by a pair of the receiving portions 14 separated by a distance in the front-and-back direction of the roof panel 13. One rigid member 50 may be supported by one receiving portion 14. A portion of a fixing member, such as a nut, the head portion of the screw S, the distal end portion of a clip, or the like, can be disposed between the intermediate portion 14b of the receiving portion 14 and the roof panel 13. A plurality of the through holes 14c are provided at intervals in the extension direction of the receiving portion 14. The reinforcing member referred to as a roof reinforcement, a roof stay, and the like may be used as the receiving portion 14.

The panel-side wiring line holding portion 15 is provided on the path of the transmission member 40. The portion of the transmission member 40 that extends out from the rigid member 50, for example, extends in the width direction of the vehicle 10 to a margin outward from the rigid member 50 and extends toward the front of the vehicle 10 in the front-and-back direction of the vehicle 10. The panel-side wiring line holding portion 15 is provided at a position closer to the outer edge than the receiving portion 14 in the width direction of the vehicle 10. For example, the panel-side wiring line holding portion 15 is provided on the path of the transmission member 40 at a position corresponding to the rigid member 50. The panel-side wiring line holding portion 15 is provided at the same position as the rigid member 50 in the front-and-back direction of the roof panel 13 or slightly in front. Accordingly, the panel-side wiring line holding portion 15 can hold the portion of the transmission member 40 extending out from the rigid member 50 that is close to the rigid member 50. In particular, the panel-side wiring line holding portion 15 can hold the portion of the transmission member 40 that is close to the portion that bends in the front-and-back direction after extending out sideward from the rigid member 50.

The panel-side wiring line holding portion 15 includes a fixing portion 15a that is fixed to the roof panel 13 and a holding portion 15b that holds the transmission member 40. In the present embodiment, the fixing portion 15a is formed in a plate-like shape extending along the roof panel 13. The holding portion 15b is formed in a plate-like shape extending downward from the fixing portion 15a. A recess portion 15c that houses the transmission member 40 is formed in the holding portion 15b. The recess portion 15c opens to the side. The transmission member 40 is housed inside the recess portion 15c from the opening portion (see FIG. 6). The transmission member 40 is held by the holding portion 15b by being supported by the bottom wall of the recess portion 15c. The portion of the transmission member 40 that extends outside the rigid member 50 is suspended and supported by the roof panel 13 via the panel-side wiring line holding portion 15. The opening portion is smaller than the recess portion 15c in the height direction of the recess portion 15c. The opening portion is provided above the recess portion 15c in the height direction. The side wall of the recess portion 15c is provided below in the opening portion. This helps stop the transmission member 40 from coming out from the recess portion 15c via the opening portion. The dimensions of the recess portion 15c in the width direction are greater than the dimensions in the height direction. Accordingly, the panel-side wiring line holding portion 15 can hold a plurality of the transmission members 40 in a flat state.

In the present embodiment, a plurality of sets (three in the example illustrated in FIG. 3) including the wiring module 20, the receiving portion 14, and the panel-side wiring line holding portion 15 are provided one vehicle body panel 13. To support the rigid members 50 of three wiring modules 20, three pairs of the receiving portions 14 are provided. Three wiring modules 20 are disposed separated in the front-and-back direction of the vehicle 10. The three pairs of receiving portions 14 are disposed separated in the front-and-back direction of the vehicle 10. The plurality (three in the example illustrated in FIG. 3) of panel-side wiring line holding portions 15 are provided at intervals in the front-and-back direction of the roof panel 13. The transmission members 40 of the three wiring modules 20 are collectively fixed in at least one (the panel-side wiring line holding portion 15 on the front side of the vehicle 10 in this example) of the three panel-side wiring line holding portions 15.

The interior member 16 is a plate-like member made of resin or the like. The interior member 16 is a portion forming the ceiling shape inside the vehicle cabin. The interior member 16 may be partially curved or have an overall curved shape. The interior member 16 is attached to the lower side of the roof panel 13. The interior member 16 corresponds to the exposed portion inside the vehicle cabin. The interior member 16 is also referred to as a roof liner.

The interior member 16 may be provided with a layer that has at least one of a thermal insulation function, a soundproofing function, and a radio wave shielding function. A functional sheet with a layer that has at least one of a thermal insulation function, a soundproofing function, and a radio wave shielding function may be provided separate to the interior member 16. The functional sheet may be provided between the wiring module 20 and the interior member 16. Note that when a device 30 on the wiring module 20 is required to be exposed in the vehicle cabin to function, an insertion hole for the device 30 is preferably formed in the interior member 16 and a functional sheet at the position corresponding to the device 30.

The layer with a thermal insulation function may be a layer that has thermal insulation properties that make it hard for heat to transfer between one main surface to the other main surface, for example. The layer with a thermal insulation function may be a layer that reflects thermal radiation energy. The layer with a thermal insulation function may be a layer with a lower thermal conductivity than other layers. For example, the layer with a thermal insulation function may include a nonwoven sheet with nonwoven fibers or a sheet with small gaps such as a foam sheet or the like. Thermal insulation coating material or thermal barrier coating material may be used as the layer with a thermal insulation function.

The layer with a soundproofing function may be a layer that has soundproofing properties that make it hard for sound to transfer between one main surface to the other main surface, for example. The layer with a soundproofing function may be a layer that reflects sound. The layer with a soundproofing function may be a layer that absorbs sound energy as thermal energy. For example, the layer with a soundproofing function may include a nonwoven sheet with nonwoven fibers or a sheet with small gaps such as a foam sheet or the like. Sound absorbing coating material may be used as the layer with a soundproofing function. One layer may have both the thermal insulation function and the soundproofing function, or the layer with a thermal insulation function and the layer with a soundproofing function may be provided as physically separate layers.

The layer with a radio wave shielding function may be a layer that make it hard for radio waves to transfer between one main surface to the other main surface, for example. The layer with a radio wave shielding function may have radio wave shielding properties relating to all frequencies. The layer with a radio wave shielding function may have selective radio wave shielding properties relating to some frequencies. In this case, the radio waves of one or more frequency bands are reflected and/or absorbed at the layer with a radio wave shielding function. The layer with a radio wave shielding function may be a layer made of a metal foil of aluminum, iron, or the like. A known Frequency Selective Surface (FSS) may be used as the layer with a radio wave shielding function with selective radio wave shielding properties. The frequency selective surface, for example, may be a unit cell (element) formed using metal foil or the like on a base film made of resin or the like. Such a frequency selective surface has the properties of selectively shielding radio waves of one or more frequency bands according to the frequency characteristics of the unit cell (element) and allowing radio waves of other frequency bands to pass through. The radio wave shielding layer with selective radio wave shielding properties may be formed by printing an electrically conductive paste or the like directly on a thermal insulation layer or a soundproofing layer.

<Wiring Module>

Figure 4:
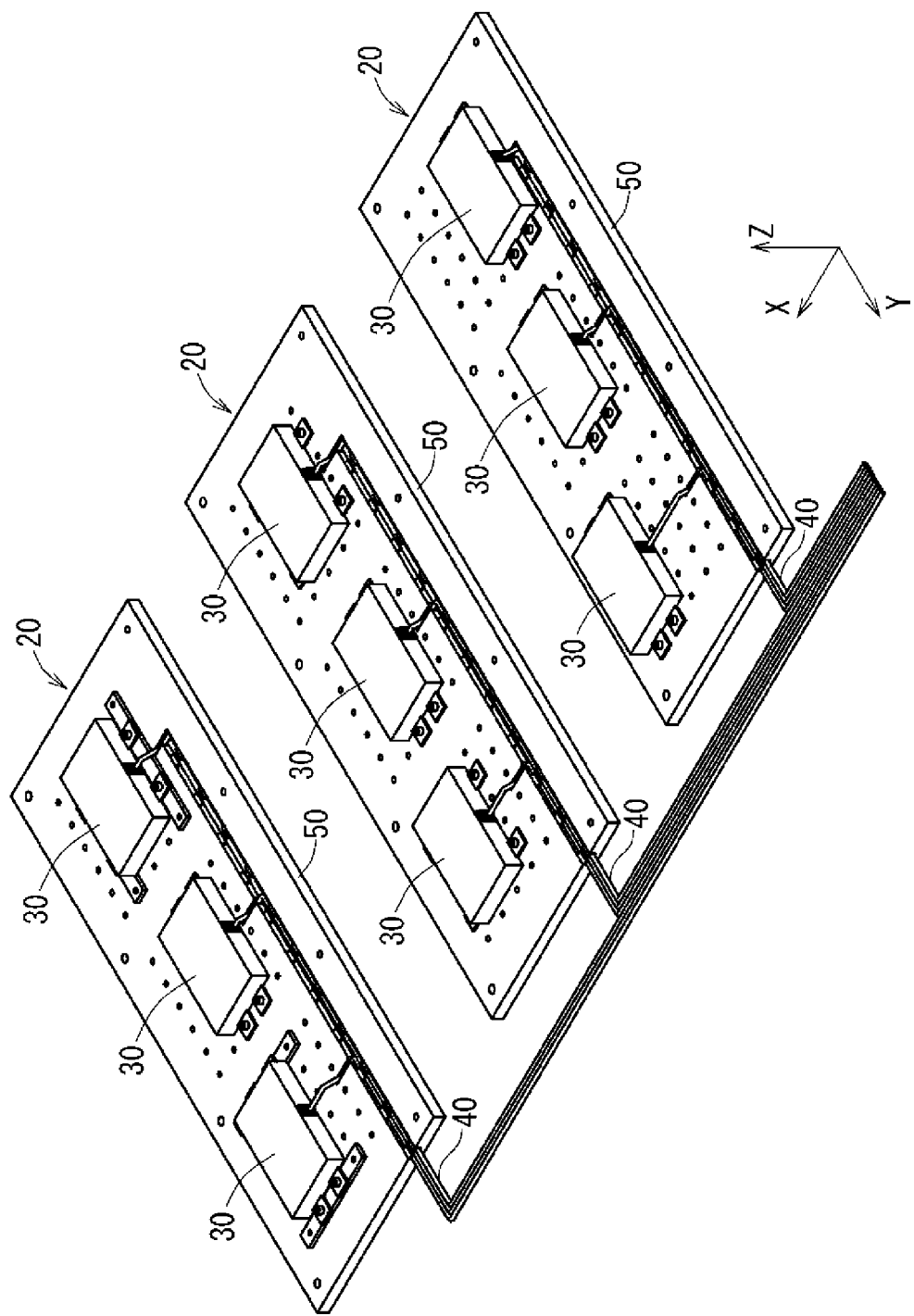
FIG. 4 is a perspective view illustrating the wiring module according to the first embodiment.
Figure 5:
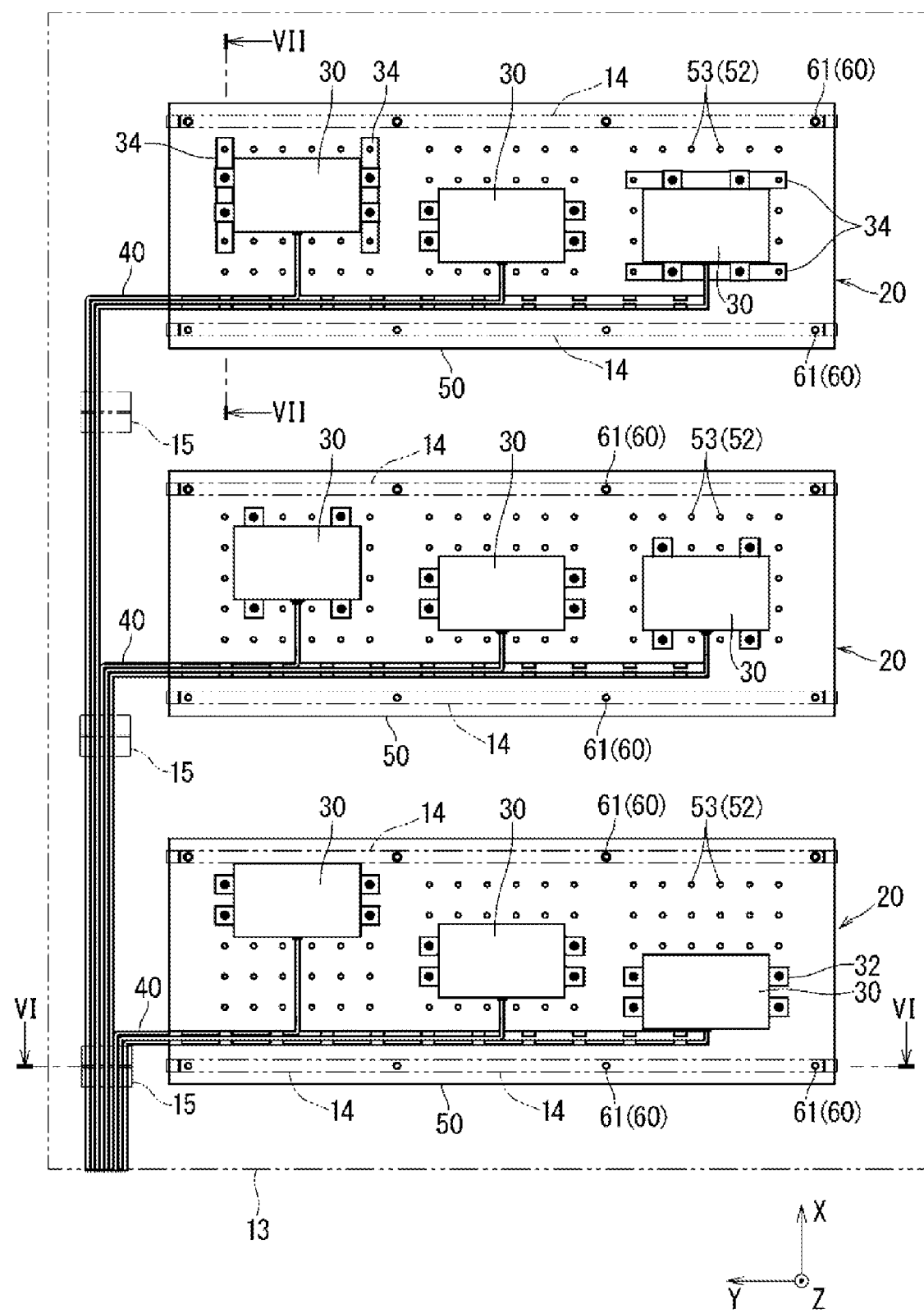
FIG. 5 is a plan view illustrating the wiring module according to the first embodiment.
Figure 6:
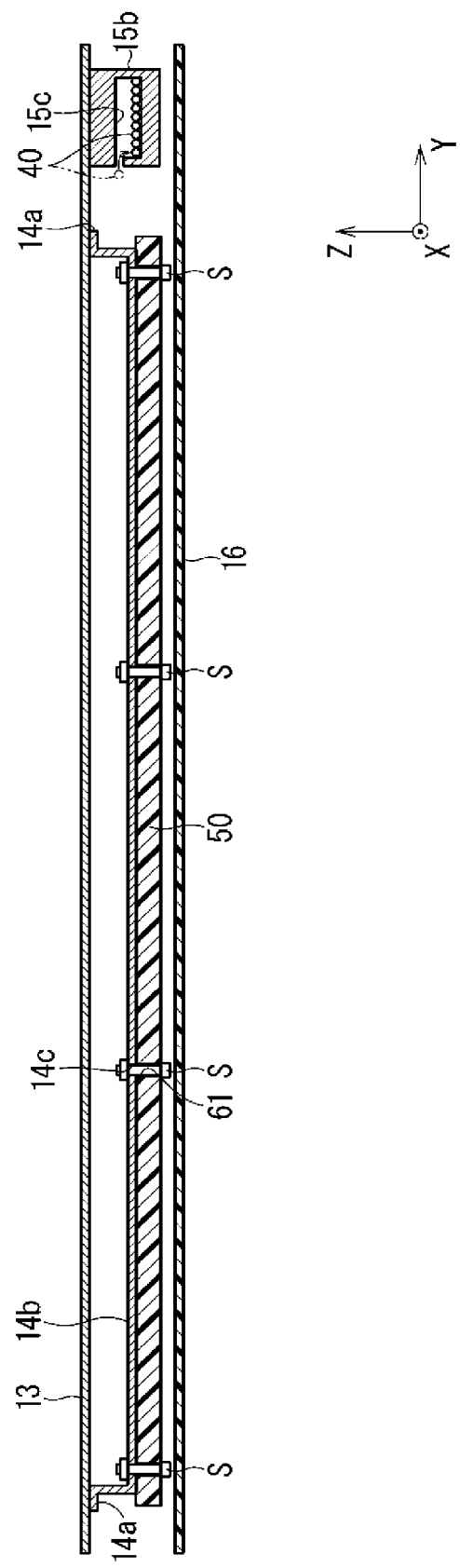
FIG. 6 is a cross-sectional view taken along line V-V in FIG. 5.
Figure 7:
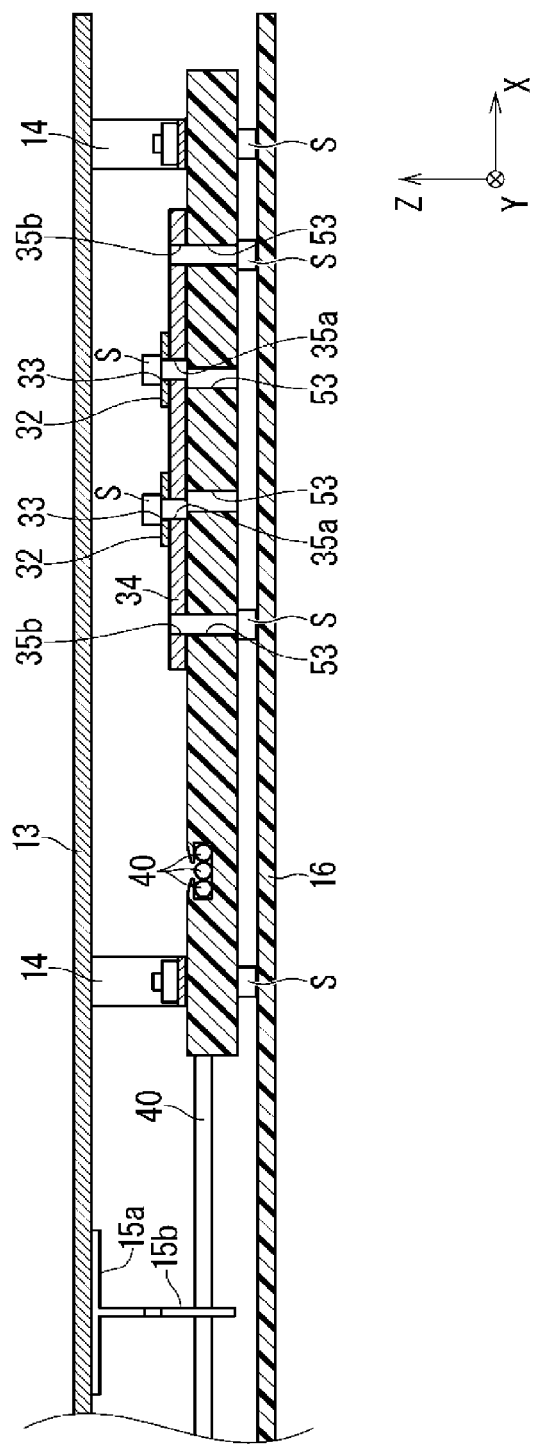
FIG. 7 is a cross-sectional view taken along line VI-VI in FIG. 5.
Figure 8:
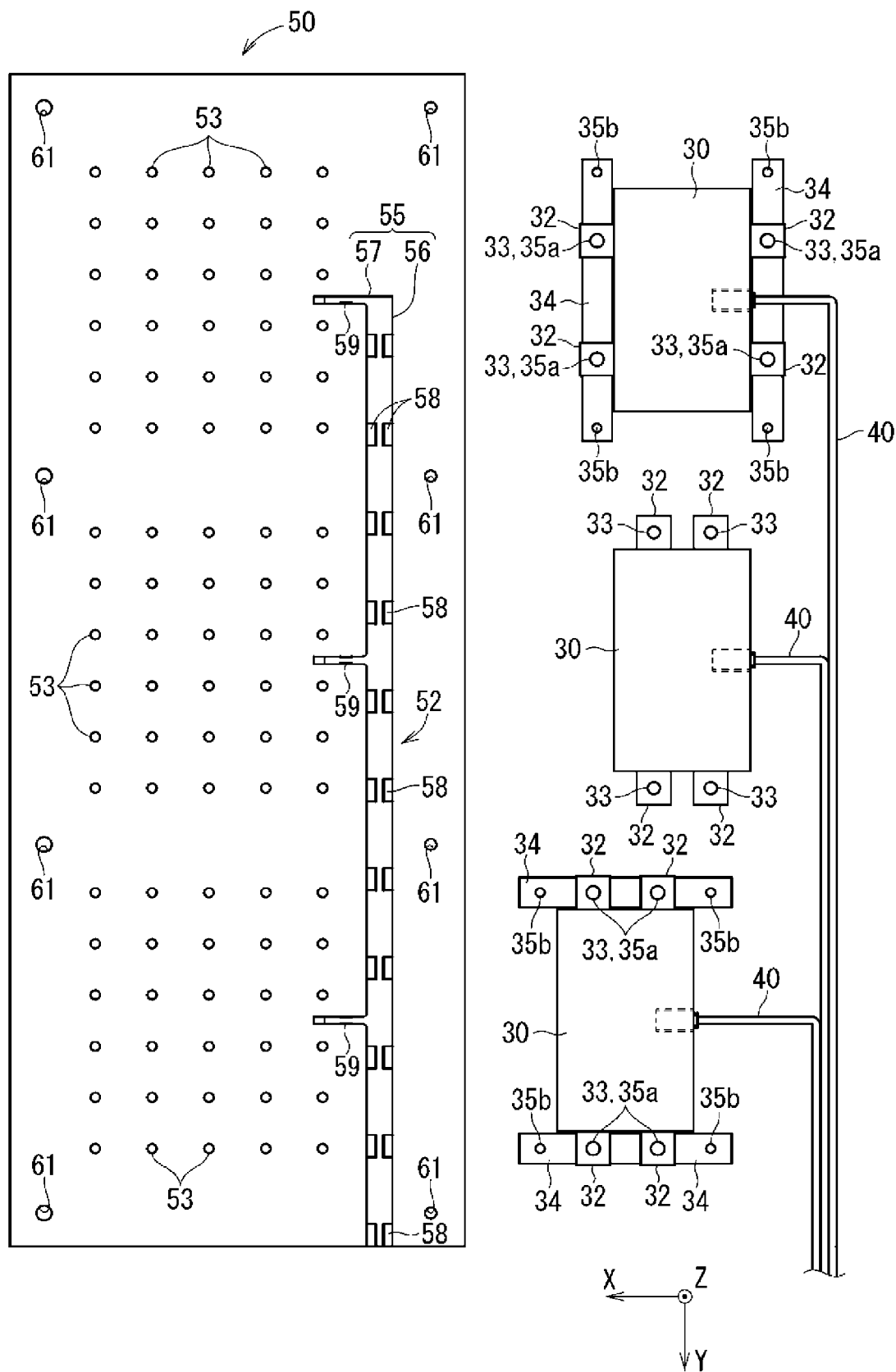
FIG. 8 is an exploded plan view illustrating the wiring module according to the first embodiment.

The wiring module 20 will be described in more detail below. FIG. 4 is a perspective view illustrating the wiring module 20 according to the first embodiment. FIG. 5 is a plan view illustrating the wiring module 20 according to the first embodiment. FIG. 6 is a cross-sectional view taken along line V-V in FIG. 5. FIG. 7 is a cross-sectional view taken along line VI-VI in FIG. 5. FIG. 8 is an exploded plan view illustrating the wiring module 20 according to the first embodiment.

The wiring module 20 includes the device 30, the transmission member 40, and the rigid member 50. The transmission member 40 extends from each device 30. The device 30 and the transmission member 40 are fixed to the rigid member 50. The rigid member 50 is fixed to the roof panel 13. The device 30 and the transmission member 40 are fixed to the roof panel 13 via the rigid member 50. The rigid member 50 preferably has enough rigidity to retain a predetermined shape when supporting the device 30 and the transmission member 40 and being fixed to the roof panel 13.

The device 30 is a device installed on the roof portion 11 which is the connection destination of the transmission member 40. The device 30 transmits and receives electrical signals and optical signals via the transmission member 40. Alternatively, the device 30 receives a supply of power via the transmission member 40 and distributes the power. Conceivable examples of the device 30 include an electronic control unit, a lamp (in particular, a map lamp or an interior lamp), a speaker, an interior camera, a monitor, a projection device, an external communication antenna, an interior antenna, and the like. The specifications, type, number, and the like of the devices 30 may change depending on the type, grade, and options for the vehicle and the like.

The rigid member 50 may flexibly accommodate changes to the design in terms of the specifications, type, number of the like of the devices 30. Each rigid member 50 is provided with at least one device 30. In this example, each rigid member 50 is provided with a plurality (three in the example illustrated in FIG. 3) of the devices 30. The arrangement position of the devices 30 on the rigid member 50 is discretionary. Also, the arrangement position of the devices 30 with respect to the roof portion 11 when the wiring module 20 is embedded in the roof portion 11 is discretionary. Preferably, the devices 30 are fixed at positions suitable for their functions with respect to the roof portion 11. For example, in a case in which the device 30 is a map lamp, the device 30 may be fixed at a portion to install it at a position diagonally up and to the front of the front seat. Also, in a case in which the device 30 is an external communication antenna, the device 30 may be fixed at a portion to install it at a position corresponding to an antenna hole formed in the roof panel 13.

The transmission member 40 is a member for transmitting electricity, light, or the like and a member provided along a wiring line path with at least one end portion connected to the device 30. For example, the transmission member 40 may be a typical electrical wire including a core wire and a cover around the core wire, or may be a naked lead wire, a shielded wire, an electrical cable, an enamel wire, a nichrome wire, a coaxial cable, an optical fiber, or the like. In other words, the transmission member 40 may be a linear member that transmits electricity. The linear member for transmitting electricity may be various types of signal lines or various types of power lines. The linear transmission member 40 for transmitting electricity may be a single linear object or may be a composite object of a plurality of linear objects (twisted wires, cables with a sheath covering a plurality of linear objects bundled together, or the like). The transmission member 40 may be formed by applying an electrically conductive coating material on a sheet-like member, performing etching on a copper foil, or the like. In the example described herein, the transmission member 40 is assumed to be a typical electrical wire.

One end portion of the transmission member 40 and the device 30 may be connected via a connector. The transmission member 40 may be directly introduced into the device 30 and directly connected to an electrical element inside the device 30. The other end portion of the transmission member 40 extends toward a device (for example, an electronic control unit, power supply, or the like) other than the device 30. The portion of the transmission member 40 that extends out from the device 30 is held by the rigid member 50. The portion of the transmission member 40 that extends out from the rigid member 50 is held by the roof panel 13. The portion of the transmission member 40 closer to the other end portion from the portion held by the roof panel 13 may be ran along a pillar or the like and connected to a device below the roof portion 11 in the vehicle 10.

The rigid member 50 includes a plurality of device fixing portions 52 and a panel fixing portion 60. Each device 30 is fixed to one device fixing portion 52 selected from the plurality of device fixing portions 52. The wiring module 20 is fixed to the vehicle body panel 13 by the panel fixing portion 60. In this example, the rigid member 50 further includes a wiring line holding portion 54. The portion of the transmission member 40 that extends out from the device 30 is held by the wiring line holding portion 54. In this example, the rigid member 50 is formed in an elongated rectangular plate-like shape. The rigid member 50 is disposed in the vehicle 10 with the direction of the long side of the rigid member 50 being aligned with the width direction of the vehicle 10. The rigid member 50 may be disposed in the vehicle 10 with the direction of the long side of the rigid member 50 being aligned with the front-and-back direction of the vehicle 10.

As the plurality of device fixing portions 52, a plurality of fixing holes 53 are formed in the surface of the rigid member 50. Each device 30 is fixed using a set of fixing holes 53 selected from the plurality of fixing holes 53. With the device 30 fixed to the rigid member 50, there are one or more of the fixing holes 53 that are not used for fixing the device 30 (fixing holes 53 that are not selected for fixing the device 30). In this example, the fixing holes 53 are used to screw together the device 30 and the rigid member 50. The device 30 and the rigid member 50 may be fixed together by inserting a clip into the fixing hole 53 or the like.

The plurality of fixing holes 53 are provided in three regions regularly formed. In each region, the plurality of fixing holes 53 are arranged side by side in a first direction and a second direction intersecting the first direction. The first direction and the second direction are discretionarily set. In this example, the first direction is the direction of the long side of the rigid member 50, and the second direction is the direction orthogonal to the first direction. The interval between the fixing holes 53 in the first direction and the interval between the fixing holes 53 in the second direction are discretionarily set. In this example, the intervals between the fixing holes 53 in the first direction are equal intervals. The intervals between the fixing holes 53 in the second direction are equal intervals. The interval between the fixing holes 53 in the first direction and the interval between the fixing holes 53 in the second direction are equal. The three regions are arranged side by side in the first direction. The interval between the regions in the first direction is larger than the interval between the fixing holes 53 in the first direction.

The device 30 is fixed at each one of the three regions described above. Accordingly, three devices 30 are disposed on one rigid member 50 separated in the long side direction of the rigid member 50. A device may be disposed straddling across a plurality of regions. The fixing holes 53 of a plurality of regions may be used to fix one device. When the rigid member 50 is disposed in the vehicle 10 with the long side direction of the rigid member 50 aligned with the width direction of the vehicle 10, the plurality of devices 30 provided on one rigid member 50 are disposed separated in the width direction of the vehicle 10.

FIG. 7 is a diagram illustrating an example of the device 30 being fixed to the device fixing portions 52 using the screws S and nuts. A housing 31 of the device 30 is provided with fixing pieces 32. A fixing hole 33 is formed in each fixing piece 32. With the screws S extending through the fixing holes 33 and 53 and nuts fastened to the distal end portions of the screws S, the device 30 and the device fixing portions 52 are fixed together. When female thread is formed in any of the fixing holes 33 and 53, the nut can be omitted. How the device 30 and the device fixing portions 52 are fixed together may be a fixing method other than via screw fastening using the screws S and nuts. For example, clips may be disposed projecting downward in the fixing pieces 32 and configured to fit and lock into the fixing holes 53 formed in the device fixing portions 52. Also, for example, protrusion portions provided on the device fixing portions 52 may lock into the fixing holes 33 formed in the fixing pieces 32. Alternatively, rivets may be used to fix the device 30 to the device fixing portions 52.

One device 30 is provided with a plurality (four in this example) of fixing pieces 32. The four fixing pieces 32 are arranged side by side in the first direction and the second direction. The fixing hole 33 is formed in each fixing piece 32. The interval between the fixing holes 33 in the first direction is preferably a multiple of the interval (including being equal) between the fixing holes 53 of the device fixing portions 52 in the first direction. In a similar manner, the interval between the fixing holes 33 in the second direction is preferably a multiple of the interval (including being equal) between the fixing holes 53 of the device fixing portions 52 in the second direction.

The interval between the fixing holes 33 in the first direction may not be a multiple of the interval (including being equal) between the fixing holes 53 of the device fixing portions 52 in the first direction. In a similar manner, the interval between the fixing holes 33 in the second direction may not be a multiple of the interval (including being equal) between the fixing holes 53 of the device fixing portions 52 in the second direction. When the interval of the fixing holes 33 and the interval of the fixing holes 53 are different, as illustrated in FIGS. 7 and 8, the device 30 may be fixed to the device fixing portions 52 via interval adjustment members 34.

The interval adjustment members 34 are formed in an elongated plate-like shape. Four fixing holes 35*a* and 35*b* are formed in each interval adjustment member 34. The interval between two fixing holes 35*a* of the four fixing holes 35*a* and 35*b* is equal to the interval between the fixing holes 33. Using the two fixing holes 35*a*, the device 30 is fixed to the interval adjustment member 34. The interval between two fixing holes 35*b* of the four fixing holes 35*a* and 35*b* is a multiple (including being equal) of the interval between the fixing holes 53. Using the two fixing holes 35*b*, the interval adjustment member 34 is fixed to the device fixing portions 52. One device 30 is fixed to the device fixing portions 52 via a pair of interval adjustment members 34. Note that one interval adjustment member may be provided for each fixing piece 32. Also, one interval adjustment member may be provided for four fixing pieces 32.

In the example of the device 30 illustrated in FIG. 8, the interval between the fixing holes 33 is different to the interval between the fixing holes 53 in only one of the first direction or the second direction. The interval between the fixing holes 33 may be different to the interval between the fixing holes 53 in both the first direction and the second direction. In this case, the fixing holes 35a and 35b may be formed offset from one another so that the interval between the fixing holes 35b formed on one of the pair of interval adjustment members 34 and the fixing holes 35b formed on the other is a multiple (including being equal) of the interval between the fixing holes 53.

As the panel fixing portion 60, a through hole 61 is formed extending through the rigid member 50 in the thickness direction. The through hole 61 is formed at a position corresponding to the through hole 14c of the receiving portion 14. In the example illustrated in FIGS. 6 and 7, the panel fixing portions 60 are fixed to the receiving portions 14 using the screws S and nuts. In other words, with the screws S extending through the through holes 14c and 61 and the nuts fastened to the distal end portions of the screws S, the receiving portions 14 and the panel fixing portions 60 are fixed together. In this example, the through holes 61 are provided at positions closer to the side edge portion of the rigid member 50 than the device fixing portions 52. At both side edge portions of the rigid member 50, a plurality (four in this example) of the through holes 61 are arranged side by side in the long side direction of the rigid member 50. Two of the four through holes 61 are provided between the three regions. The remaining two of the four through holes 61 are provided on the outer side of the three regions.

The rigid member 50 is disposed at a position corresponding to the receiving portions 14. The installation region of the receiving portions 14 and the rigid members 50 with respect to the roof panel 13 is discretionarily set. How the receiving portions 14 and the panel fixing portions 60 are fixed together may be a fixing method other than via fastening using the screws S and nuts. For example, clips may be disposed projecting downward in the roof panel 13 and configured to fit and lock into the holes formed in the rigid member 50. Also, for example, clips provided on the rigid member 50 may lock into holes formed in the receiving portions 14. Alternatively, rivets may be used to fix the rigid members 50 to the receiving portions 14.

The wiring line holding portion 54 includes a wiring line housing portion 55 and projections 58 and 59. The wiring line housing portion 55 is formed as a groove in the surface of the rigid member 50. The transmission member 40 is housed in the wiring line housing portion 55. The projections 58 and 59 help stop the transmission member 40 from coming out from the upper opening of the wiring line housing portion 55.

The wiring line housing portion 55 includes a first housing portion 56 and a second housing portion 57. The first housing portion 56 is provided between the fixing holes 53 and the through holes 61 in the width direction of the rigid member 50. The first housing portion 56 extends in the long side direction of the rigid member 50. One end portion of the first housing portion 56 meets the outer edge portion of the rigid member 50. Accordingly, the first housing portion 56 opens at the outer edge portion of the rigid member 50. The transmission member 40 extends out from the opening portion outside the rigid member 50. The second housing portion 57 extends in a direction that intersects the first housing portion 56. One end portion of the second housing portion 57 communicates with the first housing portion 56. The second housing portion 57 extends from the first housing portion 56 toward the device fixing portions 52. A plurality (three in this example) of the second housing portions 57 are provided at intervals in the long side direction of the first housing portion 56. The transmission members 40 of the plurality of devices 30 are housed in the first housing portion 56, and the transmission member 40 of one or more devices 30 is housed in the second housing portion 57. Thus in this example, each second housing portion 57 is smaller than the first housing portion 56. In particular, in this example, the width dimension of the second housing portion 57 is smaller than the width dimension of the first housing portion 56. The other end portion of the second housing portion 57 is provided with an inclined surface. Thus, the transmission member 40 can smoothly extend out from the second housing portion 57 toward the device 30 via the inclined surface.

The projection 58 is provided on the first housing portion 56, and the projection 59 is provided on the second housing portion 57. The projection 58 provided on the first housing portion 56 and the projection 59 provided on the second housing portion 57 have different shapes.

The projection 58 projects from the edge of the opening portion of the first housing portion 56 and covers the opening portion of the first housing portion 56. The projection 58 covers the top of the transmission member 40 and narrows the opening portion of the first housing portion 56 to help stop the transmission member 40 from coming out of the first housing portion 56. Also, the projection 58 is provided forming a gap that the transmission member 40 can pass through. The transmission member 40 can be housed in the first housing portion 56 from this gap. The size of the gap is preferably the same as the thickness of the transmission member 40 or slightly less. This helps stop the transmission member 40 housed in the first housing portion 56 from coming out via the gap. The projection 58 may be elastically deformable, allowing for the gap to be increased.

In this example, the projection 58 is provided at a plurality of sections at intervals in the long side direction of the first housing portion 56. At each section, a pair of the projections 58 are provided. The pair of projections 58 project toward one another from both sides of the first housing portion 56. The gap described above is formed between the distal end portions of the pair of projections 58. The pair of projections 58 may be elastically deformable, allowing for the gap to be increased.

The projection 59 projects from the inner surface of the side wall of the second housing portion 57 and narrows the housing space of the second housing portion 57. The projection 59 comes into contact with the transmission member 40. The transmission member 40 is press-fitted into the second housing portion 57 at the position where the projection 59 is provided. The projection 59 is provided at one section in the long side direction of each second housing portion 57. A pair of the projections 59 are provided. The pair of projections 59 project toward one another from both sides of the second housing portion 57. The transmission member 40 is press-fitted between the distal end portions of the pair of projections 59.

The transmission member 40 is press-fitted into the second housing portion 57, but is not press-fitted into the first housing portion 56. Thus, the portion of the transmission member 40 housed in the first housing portion 56 can be moved relatively freely compared to the portion housed in the second housing portion 57.

In this example, all of the devices 30 are disposed on the upper surface of the rigid member 50. All of the devices 30 may be disposed on the lower surface of the rigid member 50. The plurality of devices 30 may be split and disposed on both the upper surface and the lower surface of the rigid member 50. The plurality of devices 30 may be selectively provided on the upper surface or the lower surface of the rigid member 50 depending on the function of the device 30. For example, when the device 30 is an external communication antenna, the device 30 may be provided on the upper surface of the rigid member 50 and be fit in an antenna hole formed in the roof panel 13. Also, for example, when the device 30 is a lamp, the device 30 may be provided on the lower surface of the rigid member 50 and exposed inside the vehicle cabin via a hole formed in the interior member 16.

The transmission members 40 of the plurality of devices 30 collectively extend out from the rigid members 50 through the opening portion of the first housing portion 56. Accordingly, the transmission members 40 of the plurality of devices 30 can be treated as one wiring line group irrespective of the number of the devices 30.

The rigid member 50 may have higher rigidity than the interior member 16. High and low rigidity in this example may be evaluated, for example, using the surface orthogonal to the long side direction of the rigid member 50 as a reference surface, in terms of the bending rigidity of the reference surface of the rigid member 50 and the bending rigidity of the reference surface of the interior member 16 at a region partially opposite the rigid member 50. For example, the interior member 16 may be a multilayer body including a skin layer correspond to the design surface provided on urethane foam or the like, and the rigid member 50 may be a filled and solid plate material or rod material made of resin (for example, polypropylene (PP), polyamide (PA), or the like). The rigid member 50 may be a member that can be lightweight while maintaining strength such as a honeycomb structured member. The rigid member 50 may be made of a metal such as iron, aluminum, or the like. The length dimension of the rigid member 50 is discretionarily set but is set shorter than the width dimension of the vehicle 10, for example.

Effects and the Like

According to the wiring module 20 and the panel with wiring module 100 including the same configured as described above, each device 30 is fixed to the device fixing portion 52 selected from the plurality of device fixing portions 52. Thus, a change to the attachment position of the device 30, a change to the specifications of the device 30, an increase to the number of devices 30, and the like can be easily accommodated for. Also, the rigidity of the vehicle body panel 13 is normally higher than the rigidity of the interior member 16. Since the wiring module 20 is fixed to the vehicle body panel 13, even when the weight of the wiring module 20 is increased by an increase in the number of devices 30 or the like, the wiring module 20 can be appropriately supported in the vehicle 10. Accordingly, the design flexibility relating to devices 30 disposed in the vehicle 10 in an arrangement space between the vehicle body panel 13 and the interior member 16 can be increased.

Also, as the plurality of device fixing portions 52, the plurality of fixing holes 53 are formed in the surface of the rigid member 50, and each device 30 is fixed using a set of fixing holes 53 selected from the plurality of fixing holes 53. Accordingly, a change in the fixing position of the device 30, a change in the size of the device 30, or the like can be easily accommodated for by changing the set of fixing holes 53 used to secure the device 30.

Also, the rigid member 50 includes the wiring line holding portion 54 that holds the transmission member 40, and the wiring line holding portion 54 includes the wiring line housing portion 55 formed as a groove in the surface of the rigid member 50 that houses the transmission member 40 and the projections 58 and 59 that cover the opening portion of the wiring line housing portion 55 to help stop the transmission member 40 from coming out. Accordingly, there is no need to provide a member for holding the transmission member 40 in addition to the rigid member 50. Also, when changing the devices 30, the transmission member 40 can be easily attached to and detached from the wiring line holding portion 54. Furthermore, the transmission members 40 of the plurality of devices 30 are grouped as they extend out from the rigid member 50 through the outlet of the wiring line housing portion 55, allowing the transmission members 40 of the plurality of devices 30 to be treated as one wiring line group.

The arrangement space is the space inside the roof between the roof panel 13, which is the vehicle body panel 13, and the roof liner 16, which is the interior member 16. Accordingly, a change, increase in number, or the like of the devices 30 disposed in the space inside the roof can be easily accommodated for.

The vehicle body panel 13 is provided with the receiving portion 14 where the panel fixing portion 60 of the rigid member 50 is fixed and the panel-side wiring line holding portion 15 that holds the portion of the transmission member 40 that extends outside the rigid member 50. Accordingly, when the wiring module 20 is fixed to the vehicle body panel 13, the portion of the transmission member 40 that extends outside of the rigid member 50 can also be held by the vehicle body panel 13.

A plurality of the wiring modules 20, the receiving portions 14, and the panel-side wiring line holding portions 15 are provided on one vehicle body panel 13, and the transmission members 40 of the plurality of wiring modules 20 are collectively held by at least one of the plurality of panel-side wiring line holding portions 15. Accordingly, the transmission members 40 of the plurality of wiring modules 20 can be easily held by one vehicle body panel 13.

For example, the transmission members 40 of the plurality of wiring modules 20 may not be grouped at the stage prior to being held by the panel-side wiring line holding portion 15. Accordingly, the plurality of wiring modules 20 can be separately stored, transported, and the like at the stage prior to be fixed to the vehicle body panel 13. This allows the storage space and the transport space for the wiring modules 20 to be made smaller. Also, the plurality of wiring modules 20 can be separately attached to the panel.

Second Embodiment

Figure 9:
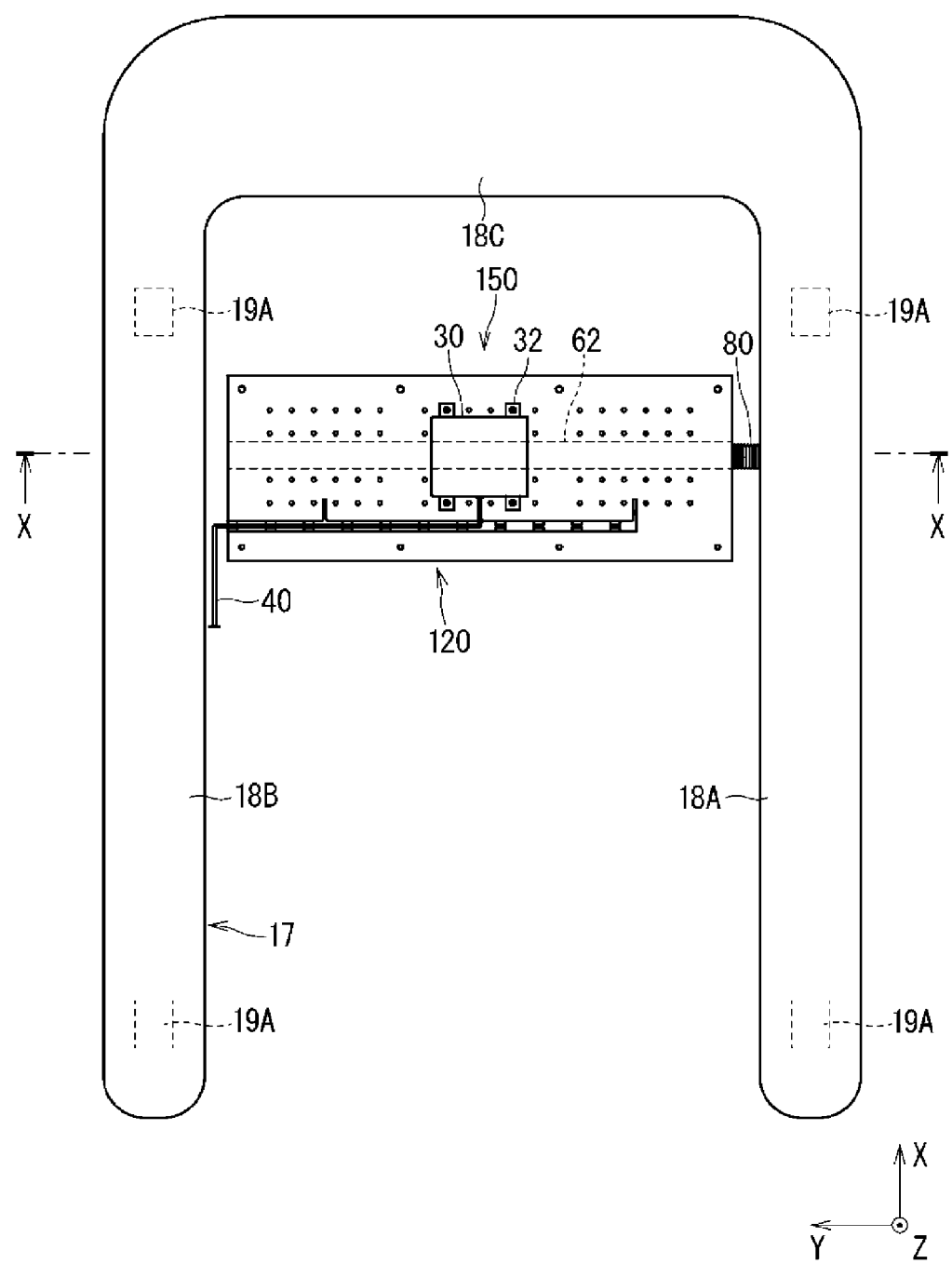
FIG. 9 is a plan view illustrating a wiring module according to a second embodiment.
Figure 10:
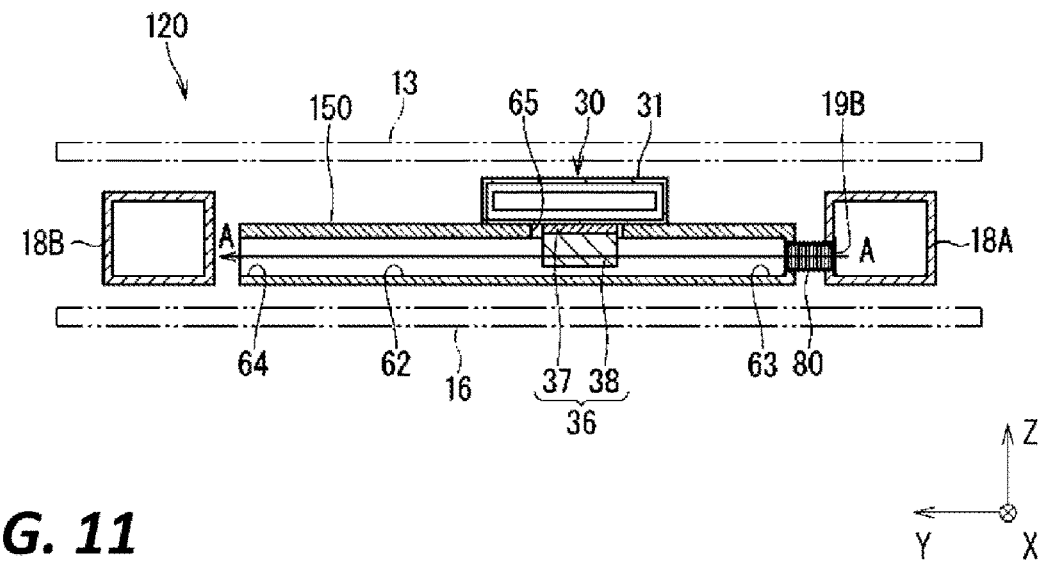
FIG. 10 is a cross-sectional view taken along line X-X in FIG. 9.

A wiring module according to the second embodiment will now be described. FIG. 9 is a plan view illustrating a wiring module 120 according to the second embodiment. FIG. 10 is a cross-sectional view taken along line X-X in FIG. 9. Note that in the description of the present embodiment, components similar to that described above are given the same reference sign and description thereof will be omitted. The same applies to the embodiments and modified examples to be described below.

The wiring module 120 is different from the wiring module 20 described above in that a flow path 62 is provided in a rigid member 150. Cooling air enters the flow path 62 from a duct 17. Accordingly, the device 30 fixed to the rigid member 150 can be cooled.

The duct 17 illustrated in FIG. 9 is the duct 17 for the back seat. The duct 17 includes duct-side flow paths 18A, 18B, and 18C. The duct-side flow paths 18A and 18B extend in the X direction at both sides of the vehicle 10. The duct-side flow path 18C extends in the Y direction at the back of the vehicle 10 and connects with the duct-side flow paths 18A and 18B. The duct 17 is provided with an outlet 19A orientated toward the back seat. The outlets 19A and 19B are provided in the duct-side flow paths 18A and 18B, for example. Note that in the vehicle 10, the air conditioning system unit, such as an air conditioner unit or the like, is not normally disposed in the space inside the roof and is disposed below the space inside the roof (for example, inside an installment panel, behind the back seat, or the like). The duct 17 for the back seat is connected to the air conditioning system unit disposed behind the back seat via a duct that runs along the C pillar, for example. The cold air from the air conditioning system unit is discharged toward the back seat via the outlets 19A and 19B.

The flow path 62 of the rigid member 150 is formed inside the hollow rigid member 150. The flow path 62 is formed by the space inside the rigid member 150 and the inner surface surrounding the space. The flow path 62 extends in the long side direction of the rigid member 150.

The flow path 62 is connected to the duct-side flow path of the duct 17 in the vehicle 10. In this example, the flow path 62 connects to only one, the duct-side flow path 18A, of the duct-side flow paths 18A and 18B on both sides of the vehicle 10. The flow path 62 opens in three directions. The three openings are an inlet 63, an exposure hole 65, and an outlet 64. The flow path 62 does not communicate with the fixing holes 35. For example, the flow path 62 may be provided between the fixing holes 35 in the width direction of the rigid member 150. The device 30 may be disposed straddling the flow path 62.

The inlet 63 opens at an outer surface (a surface facing a duct-side flow path 18A) of the rigid member 150 facing the Y direction. The inlet 63 is connected to the duct-side flow path 18A. This allows the cooling air to flow inside the flow path 62 from the duct-side flow path 18A via the inlet 63. In this example, the flow path 62 and the duct-side flow path 18A are connected via a tube-shaped member 80. The outlet 19B orientated toward the rigid member 50 is provided in the duct-side flow path 18A separately from the outlet 19A orientated toward the back seat. The outlet 19B opens at a surface facing the rigid member 50. The inlet 63 and the outlet 19B are provided at corresponding positions in the XZ plane. The inlet 63 and the outlet 19B are connected via the tube-shaped member 80. The inlet 63 is an opening smaller than the flow path 62. Thus, the peripheral portion of the inlet 63 corresponds to a flat plate portion extending along the XZ plane.

The exposure hole 65 opens at the upper surface of the rigid member 150. The exposure hole 65 opens at a portion of the upper surface opposite the device 30. For example, the exposure hole 65 is a rectangular shape elongated in the Y direction more so than the X direction as seen from the Z direction. Note that the size and the shape of the exposure hole 65 is not particularly limited and can be set as appropriate.

The outlet 64 is an opening different from the inlet 63 and the exposure hole 65. The device 30 is provided between the inlet 63 and the outlet 64 in the extension direction of the flow path 62. The outlet 64 opens at an outer surface (a surface facing the duct-side flow path 18B) of the rigid member 150 facing the Y direction on the opposite side to the surface where the inlet 63 opens. The outlet 64 is an opening of the same size as the flow path 62.

The device 30 is provided with a heat dissipation portion 36. The heat dissipation portion 36 faces the exposure hole 65. Thus, the heat dissipation portion 36 can come into direct contact with the cooling air. In this example, the heat dissipation portion 36 projects to the exposure hole 65 side more than a portion of the housing 31 that comes into contact with the rigid member 150. Note that the outer surface of the heat dissipation portion 36 may be the same flat surface as the portion of the housing 31 that comes into contact with the rigid member 150. In this example, the heat dissipation portion 36 projects to the flow path 62. Note that the heat dissipation portion 36 may stop within the exposure hole 65 and may not project to the flow path 62. In this example, as the heat dissipation portion 36, a heat transfer member 37 and a heat sink 38 are provided.

The heat transfer member 37 is attached to the lower surface of the housing 31. The heat transfer member 37 is not particularly limited, but as the heat transfer member 37, for example, a member that can adhere to the housing 31 without gaps is preferably used. Examples of the heat transfer member 37 include a heat dissipation grease, a heat dissipation sheet, a heat dissipation rubber, and the like.

The heat sink 38 is attached to the lower surface of the heat transfer member 37. The heat sink 38 includes a base and a plurality of fins. The base and the plurality of fins are formed in a flat plate-like shape. The base extends parallel with the XY plane. The base connects the plurality of fins on the device 30 side in the Z direction. The plurality of fins are located inside the flow path 62. The plurality of fins project parallel with one another in the Z direction from one surface of the base. Each fin extends parallel with the YZ plane. The plurality of fins are separated from one another in the X direction. Accordingly, the cooling air can escape from the space between opposing fins, and the amount of heat exchanged between the heat sink 38 and the cooling air is increased.

In FIG. 10, the flow of the cooling air in the flow path 62 is indicated by an arrow A. The cooling air that enters the flow path 62 from the inlet 63 flows toward the outlet 64, passing the portion where the device 30 is provided along the way. At this time, the cooling air receives heat from the device 30 and is warmed. The device 30 transfers heat to the cooling air and is cooled. The warmed cooling air is discharged from the outlet 64 into the space inside the roof. Accordingly, the warmed cooling air stays inside the flow path 62, and a decrease in the heat exchange efficiency between the cooling air and the device 30 can be suppressed. In other words, when the air conditioning system unit runs and sends cooling air to the flow path 62, the device 30 can exchange heat with constantly renewed cooling air.

In particular, in this example, the heat sink 38 of the heat dissipation portion 36 is disposed inside the flow path 62. Accordingly, heat can be exchanged between the cooling air flowing in the flow path 62 and the heat sink 38, allowing a large amount of heat to be transferred from the device 30 side to the cooling air.

The tube-shaped member 80 is disposed between the rigid member 150 and the duct 17. The tube-shaped member 80 connects the rigid member 150 and the duct 17 for the back seat. The tube-shaped member 80 connects the rigid member 150 and the duct 17 at one end portion of the rigid member 150. In this example, one end portion of the tube-shaped member 80 is connected to the inlet 63, and the other end portion of the tube-shaped member 80 is connected to the outlet 19B. The tube-shaped member 80 includes a tube-shaped body portion formed in a ribbed shape and a flange portion that flares out more than the tube-shaped body portion. The ribbed tube-shaped body portion allows for tolerance relating to the misalignment of the inlet 63 and the outlet 19B. The flange portion is provided on both end portions of the tube-shaped body portion. Both end portions of the tube-shaped member 80 are maintained in connection with the rigid member 150 and the duct 17 due to the flange portions. Specifically, one end portion of the tube-shaped member 80 is inserted from the inlet 63 into the flow path 62, and the flange portion is caught on the peripheral portion of the inlet 63. The other end portion of the tube-shaped member 80 is inserted from the outlet 19B into the duct-side flow path 18, and the flange portion is caught on the peripheral portion of the outlet 19B.

Figure 11:
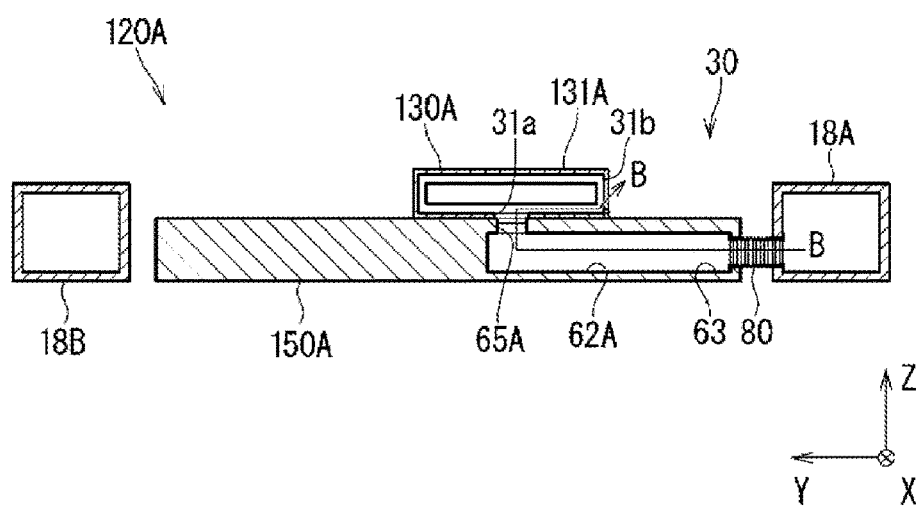
FIG. 11 is a cross-sectional view illustrating a first modified example of the wiring module according to the second embodiment.

FIG. 11 is a cross-sectional view illustrating a first modified example of the wiring module 120 according to the second embodiment.

In a wiring module 120A of the present example, the flow of cooling air indicated by an arrow B in FIG. 11 is different from the flow of the cooling air in the wiring module 120 described above. A housing-side inlet 31a is formed in a housing 131A of a device 130A. The housing-side inlet 31a is formed at a surface of the housing 131A that faces an exposure hole 65A of a rigid member 150A. The cooling air flowing in a flow path 62A flows through the exposure hole 65A, the housing-side inlet 31a, and the housing 131A and is discharged into the space inside the roof. Thus, the inside of the housing 131A can be directly cooled by the cooling air.

In the example illustrated in FIG. 11, a first through hole 31a and a second through hole 31b are formed in the housing 131A. The first through hole 31a is formed at a surface of the housing 131A that faces an exposure hole 65A. The second through hole 31b is formed at a surface of the housing 131A different from the surface where the first through hole 31a is formed. Inside the housing 131A, the space with the opening of the first through hole 31a and the space with the opening of the second through hole 31b are connected. The first through hole 31a functions as the housing-side inlet 31a. The second through hole 31b functions as a housing-side outlet 31b. Note that in the housing 131A, it is not necessary that the second through hole 31b is formed as the housing-side outlet 31b. For example, when the housing is configured of a container without a lid, the opening of the container functions as the housing-side outlet. Also, for example, in the housing, when there is a gap connecting the external space and the internal space, the gap may function as the housing-side outlet. This gap, for example, may be a gap between the container and the lid or a gap for exposing the connector connected to the transmission member 40.

In the rigid member 150A, the outlet 64 described above is omitted. The flow path 62A does not open anywhere other than the inlet 63 and the exposure hole 65A. In other words, the flow path 62A is closed everywhere other than the inlet 63 and the exposure hole 65A. Accordingly, the cooling air flowing in the flow path 62A basically flows through the exposure hole 65A and is discharged into the space inside the roof. Thus, in the present example, the exposure hole 65A functions as an outlet. The flow path 62A is shorter in the Y direction than the flow path 62 described above. The flow path 62A closes at a position just beyond the exposure hole 65A in the Y direction.

Also, in the present example, as the heat dissipation portion 36, the heat transfer member 37 and the heat sink 38 are not provided. Also, in the present example, one or both of the heat transfer member 37 and the heat sink 38 may not be provided.

Figure 12:
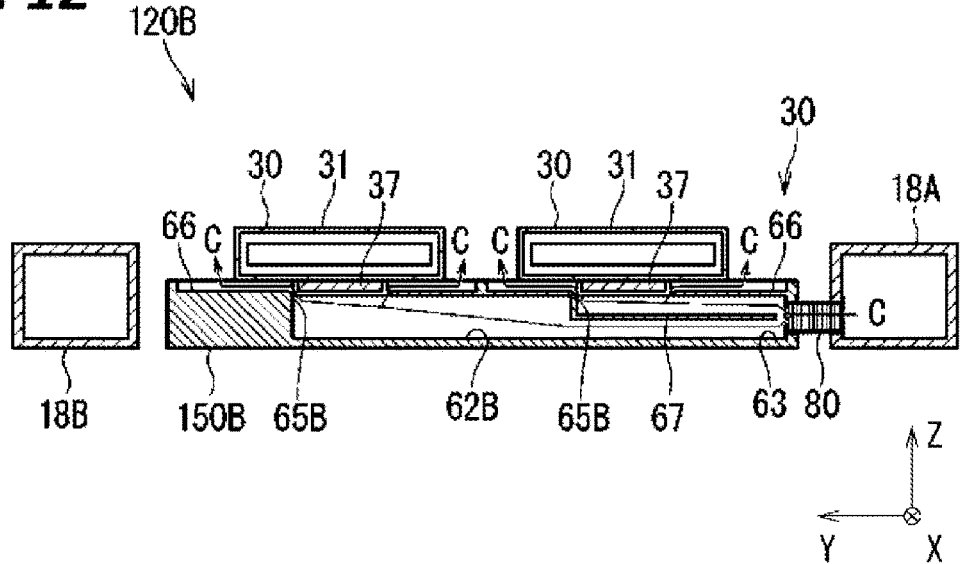
FIG. 12 is a cross-sectional view illustrating a second modified example of the wiring module according to the second embodiment.

FIG. 12 is a cross-sectional view illustrating a second modified example of the wiring module 120 according to the second embodiment.

In a wiring module 120B of the present example, the flow of cooling air indicated by an arrow C in FIG. 12 is different from the flow of the cooling air in the wiring module 120 described above. In the present example, a gap is provided between a portion of the upper surface of a rigid member 150B surrounding an exposure hole 65B and the device 30. The cooling air flowing in a flow path 62B flows through the exposure hole 65B and the gap described above and is discharged into the space inside the roof. Thus, the device 30 can be directly cooled by the cooling air.

In this example, in the upper surface of the rigid member 150B, a recess portion 66 is formed in the portion adjacent to the exposure hole 65B. The upper surface of the rigid member 150B at the position of the recess portion 66 is lower than the upper surface of the rigid member 150B at the position surrounding the recess portion 66. The edge portion of the recess portion 66 in the Y direction is located further outward than the device 30. Accordingly, a gap for discharging the cooling air from the exposure hole 65 to the space inside the roof is formed between the outer surface of the recess portion 66 and the outer surface of the device 30.

In the present example, as the heat dissipation portion 36, the heat transfer member 37 is provided. The heat transfer member 37 reduces the gap between the portion surrounding the exposure hole 65B and the device 30.

Also, in the present example, two devices 30 are provided. Two devices 30 are provided separated in the Y direction on one rigid member 150B. In the upper surface of the rigid member 150B, two exposure holes 65B for the two devices 30 are provided.

A divider 67 is provided inside the rigid member 150B. The divider 67 divides the flow path 62B into a first flow path for a first one of the devices 30 and a second flow path for the second devices 30. Accordingly, when the cooling air flows toward the two devices 30, the cooling air can flow in the different flow paths. The cooling air flowing toward the second device 30 being too little compared to the cooling air flowing toward the first device 30 can be suppressed, and cooling air warmed by heat exchange with the first device 30 flowing toward the second device 30 can be suppressed.

The divider 67 is connected to the inner surface in the flow path 62B at both sides in the X direction. A first end portion of the divider 67 in the Y direction is located between the exposure hole 65B for the first device 30 and the inlet 63. The first end portion of the divider 67 in the Y direction is not connected to the inner surface in the flow path 62B in the Y direction. A second end portion of the divider 67 in the Y direction is located between the exposure hole 65B for the first device 30 and the exposure hole 65B of the second device 30. The second end portion of the divider 67 in the Y direction is bent in the Z direction. The second end portion of the divider 67 is connected to the inner surface located on the upper surface side in the Z direction. The flow path for the first device 30 is closed everywhere other than the opening on the first end portion side and the exposure hole 65B for the first device 30. The flow path for the second device 30 is closed everywhere other than the opening on the first end portion side and the exposure hole 65B for the second device 30.

In the present example also, in the rigid member 150B, the outlet 64 described above is omitted. The flow path 62B is closed everywhere other than the inlet 63 and the exposure hole 65B. The flow path 62B does not open anywhere other than the inlet 63 and the exposure hole 65B. The exposure hole 65B also functions as an outlet. Accordingly, the cooling air flowing in the flow path 62B is basically discharged into the space inside the roof from the exposure hole 65B. The flow path 62B is shorter in the Y direction than the flow path 62 described above. The flow path 62B closes at a position just beyond the exposure hole 65B in the Y direction.

Figure 13:
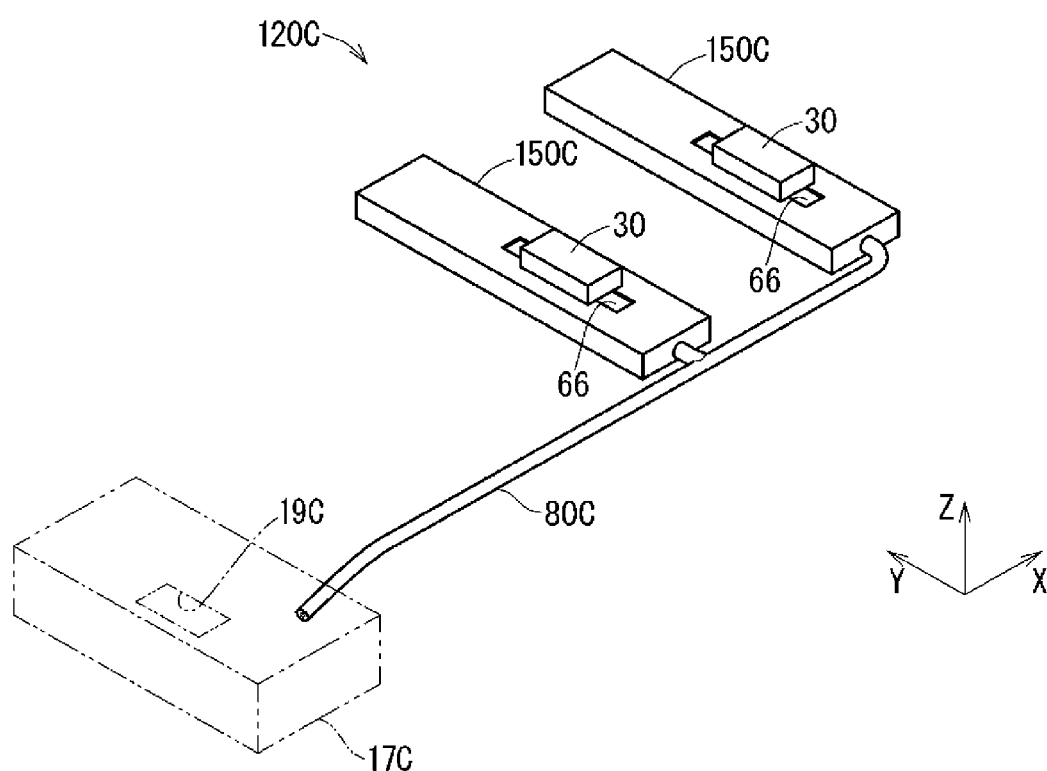
FIG. 13 is a perspective view illustrating a third modified example of the wiring module according to the second embodiment.
Figure 14:
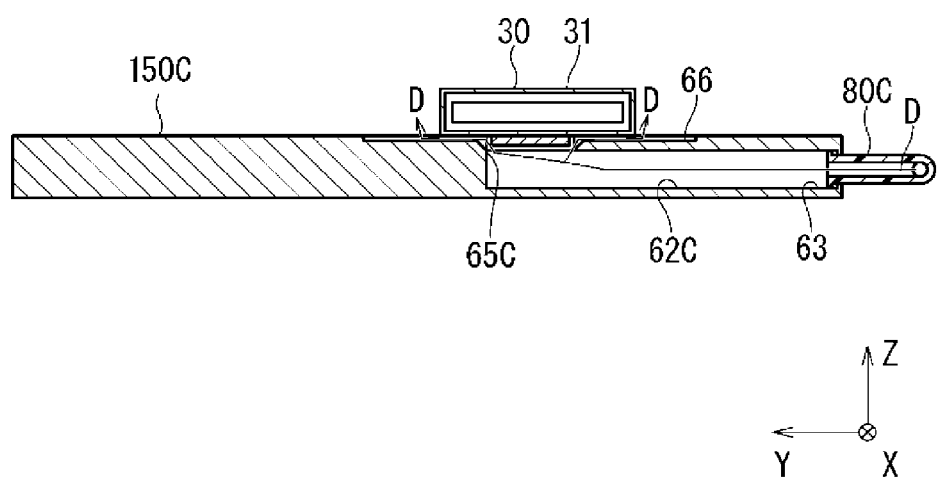
FIG. 14 is a cross-sectional view illustrating the third modified example of the wiring module according to the second embodiment.

FIG. 13 is a perspective view illustrating a third modified example of the wiring module 120 according to the second embodiment. FIG. 14 is a cross-sectional view illustrating the third modified example of the wiring module 120 according to the second embodiment.

In a wiring module 120C of the present example, a duct 17C is not for the back seat but for the front seat. The duct 17C is provided with an outlet 19C orientated toward the front seat. The tube-shaped member 80C connects a rigid member 150C and the duct 17C for the front seat. Accordingly, the rigid member 150C and the duct 17C for the front seat can be connected via the tube-shaped member 80C.

The duct 17C for the front seat may be disposed in the space inside the roof in a similar manner to the duct 17 for the back seat described above. The duct 17C for the front seat may not be disposed in the space inside the roof. For example, the duct 17C for the front seat may be disposed in the space behind the installment panel.

The tube-shaped member 80C is longer than the tube-shaped member 80 described above. The duct 17C is disposed separated from the rigid member 150C in the X direction in the space inside the roof. Also, the duct 17C is not disposed in the space inside the roof and is disposed below the space inside the roof. Thus, the tube-shaped member 80C extends in the X direction from the connection portion with the rigid member 150C. When the duct 17C is not disposed in the space inside the roof and disposed lower than the space inside the roof, the tube-shaped member 80C may extend from the space inside the roof down along the A pillar and connect to the duct 17C.

Note that in a similar manner to the tube-shaped member 80, the end portion of the tube-shaped member 80C is provided with a flange portion, and the flange portion stops falling out from a flow path 62C. Also, the tube-shaped body portion of the tube-shaped member 80C is a straight tube shape but may have a ribbed tube shape in a similar manner to the tube-shaped body portion of the tube-shaped member 80 described above.

In a similar manner to the rigid member 150B described above, the rigid member 150C of the present example is provided with a gap between a portion surrounding the exposure hole 65C and the device 30. The gap is formed by the recess portion 66. Also, in the rigid member 150C, the outlet 64 is omitted. The flow path 62C is closed everywhere other than the inlet 63 and the exposure hole 65C. Note that the rigid member 150C of the present example supports one device 30. Thus, as indicated by an arrow D in FIG. 14, the cooling air flowing in a flow path 62C flows through the exposure hole 65C and the gap described above and is discharged into the space inside the roof. Thus, the device 30 can be directly cooled by the cooling air.

In the present example, a plurality of the rigid members 150C are provided. The device 30 is supported on each one of the plurality of rigid members 150C. The plurality of rigid members 150C are provided separated from one another in the X direction. One tube-shaped member 80C branches partway along from the duct 17C side toward the plurality of rigid members 150C and connects to each one of the plurality of rigid members 150C. Thus, the tube-shaped member 80C is provided with a branch portion. Accordingly, the plurality of rigid members 150C and the duct 17C can be connected via one tube-shaped member 80C. Note that the plurality of rigid members 150C may be connected to the duct 17C via different tube-shaped members.

[Modified Example of Rigid Member]

Figure 15:
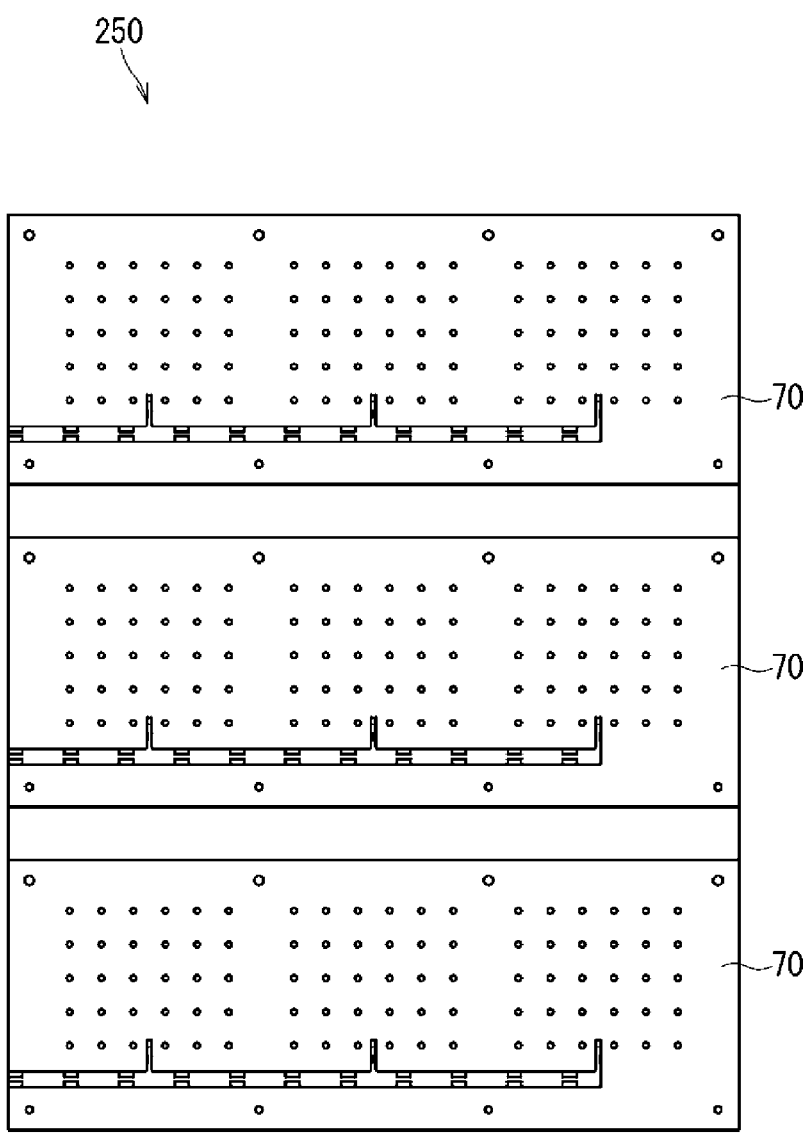
FIG. 15 is a plan view illustrating a rigid member according to a first modified example.

FIG. 15 is a plan view illustrating a rigid member 250 according to a modified example.

Figure 16:
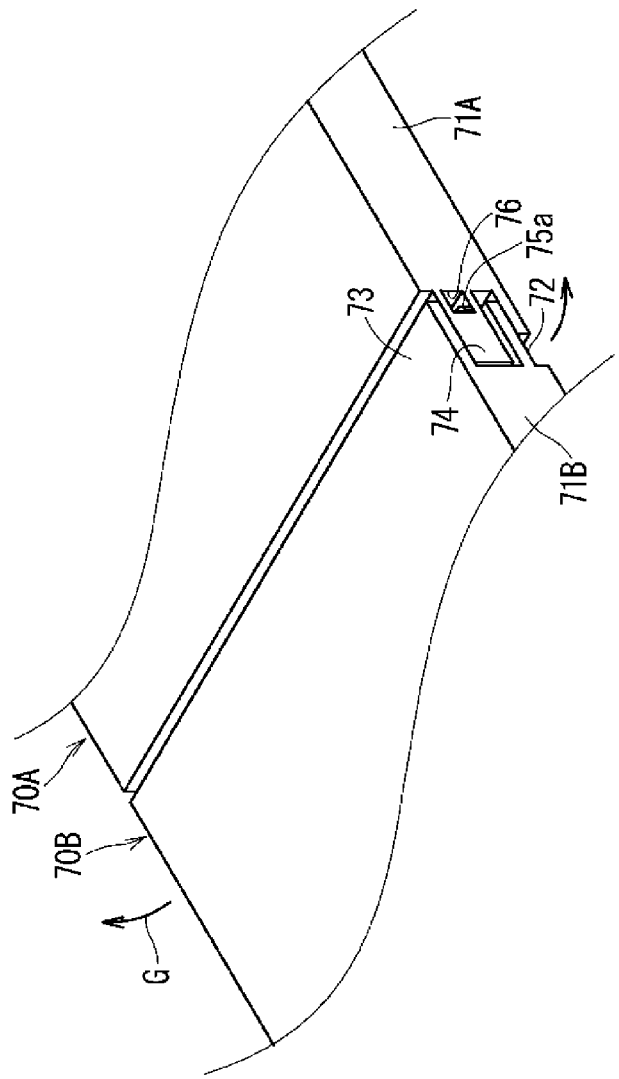
FIG. 16 is a partial enlarged perspective view illustrating the connection structure of a plurality of divided members.
Figure 17:
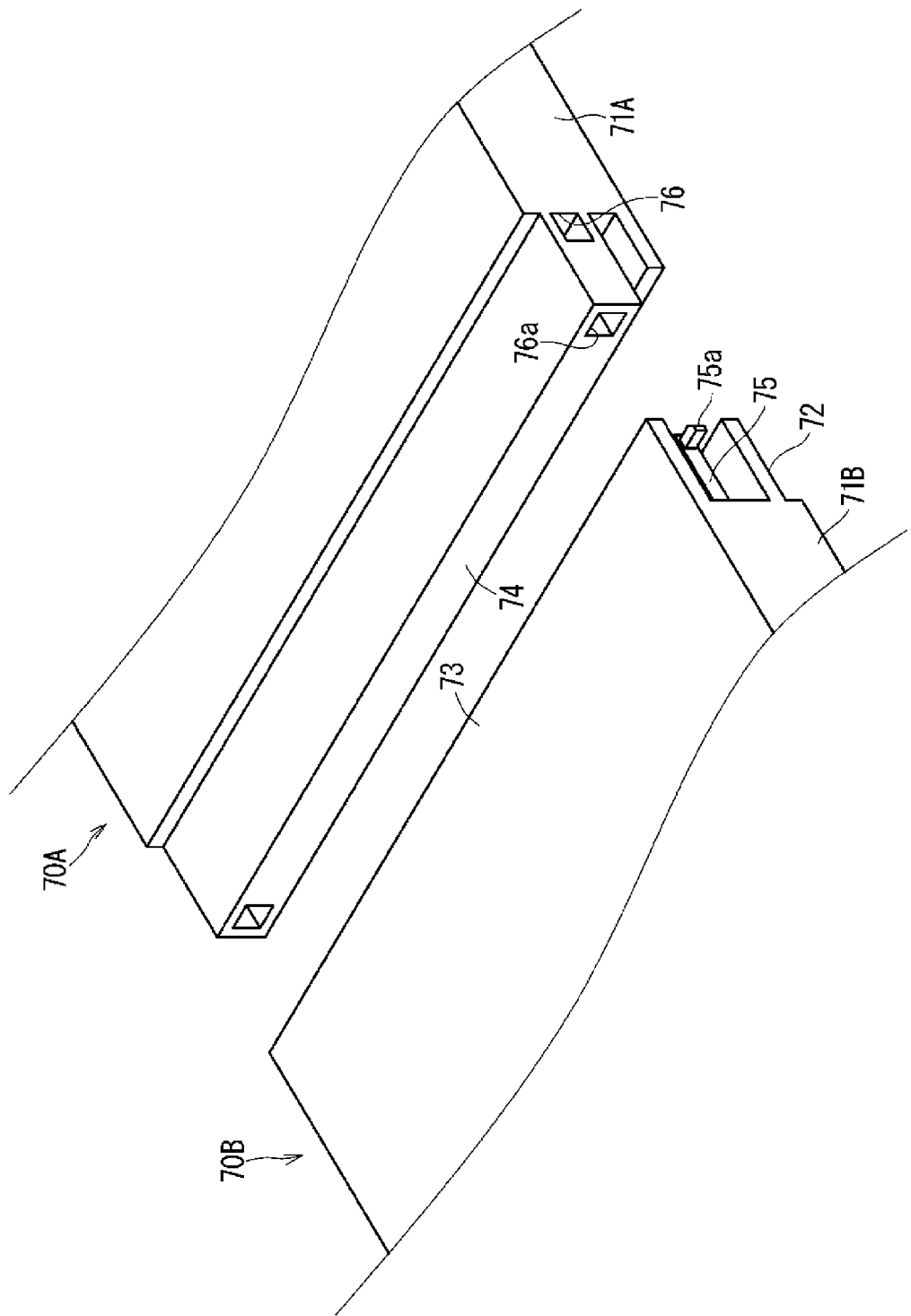
FIG. 17 is a partial exploded perspective view illustrating the connection structure of the plurality of divided members.
Figure 18:
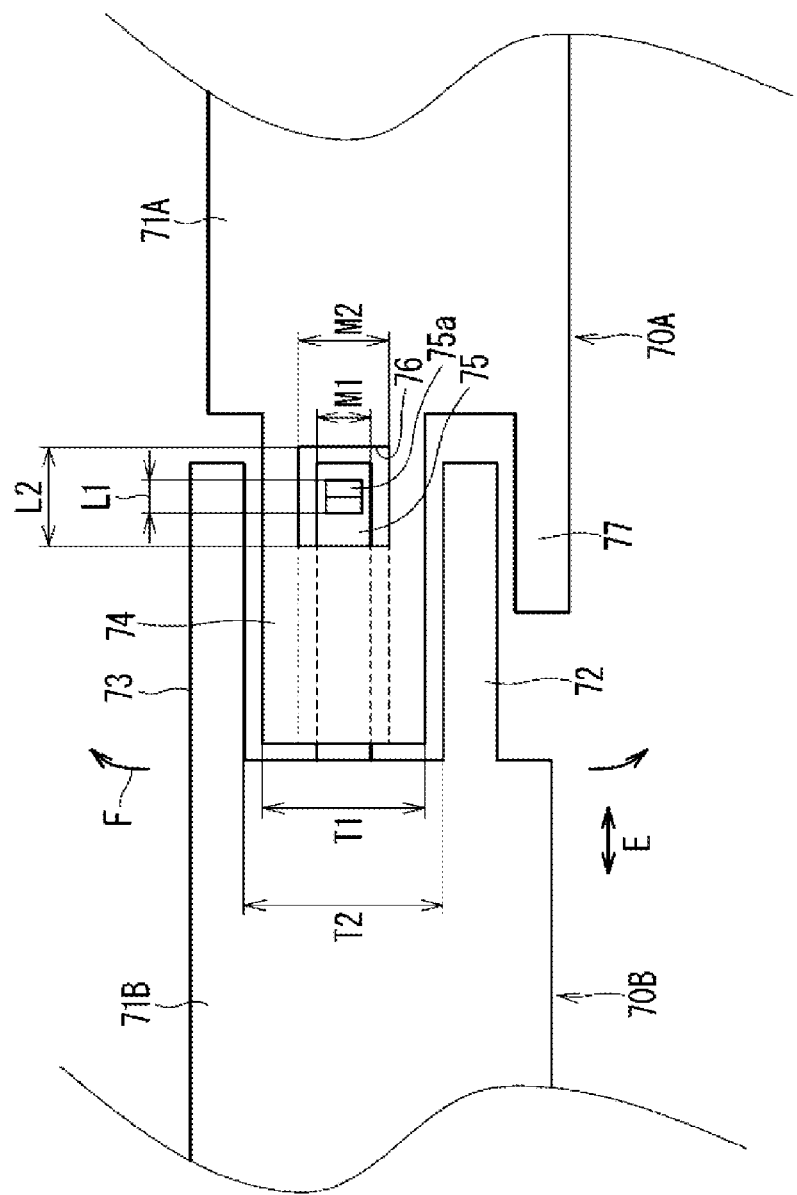
FIG. 18 is a partial enlarged side view illustrating the connection structure of the plurality of divided members.

In the examples described above, one vehicle body panel 13 is provided with a plurality of the wiring modules 20, but such a configuration is not required. One vehicle body panel 13 may be provided with one wiring module 20. The single rigid member 50 of the single wiring module 20 may be formed with a size allowing it to cover the majority of the vehicle body panel 13. The rigid member 50, for example, may be configured so that one shaped member can cover the majority of the vehicle body panel 13. Also, for example, as with the rigid member 250 illustrated in FIG. 15, one rigid member 250 may be configured as an assembly of a plurality of divided members 70, each covering a portion of the vehicle body panel 13. The connection structure of the plurality of divided members 70 will be now described with reference to FIGS. 16 to 18. FIG. 16 is a partial enlarged perspective view illustrating the connection structure of the plurality of divided members 70. FIG. 17 is a partial exploded perspective view illustrating the connection structure of the plurality of divided members 70. FIG. 18 is a partial enlarged side view illustrating the connection structure of the plurality of divided members 70.

The plurality of divided members 70 are connected in a manner allowing for movement relative to one another. It is sufficient that the plurality of divided members 70 can move relative to one another in at least one direction. The plurality of divided members 70 may be connected in a manner allowing them to move toward or away from one another (see arrow E in FIG. 18), swing in the thickness direction (see arrow F in FIG. 18) of the rigid member 250, and swing in a direction (see arrow G in FIG. 16) intersecting the toward and away direction of the plurality of divided members 70 and the thickness direction of the rigid member 250, and in the present embodiment, the configuration regarding this will be described. In the description, one of the two connected divided members 70 is referred to as a divided member 70A and the other as 70B.

The divided member 70A includes a body portion 71A extending in a plate-like shape and a connection piece 74. The connection piece 74 is provided on the edge portion of the body portion 71A on the divided member 70B side. The connection piece 74 extends from the body portion 71A to the divided member 70B side.

Specifically, the body portion 71A and the connection piece 74 are integrally molded using resin. The connection piece 74 projects toward an intermediate portion of the body portion 71A in the thickness direction on the side surface on the divided member 70B side.

The divided member 70B includes a body portion 71B extending in a plate-like shape, a first clamping piece 72, and second clamping piece 73. The first clamping piece 72 and the second clamping piece 73 are provided on the edge portion of the body portion 71B on the divided member 70A side. The first clamping piece 72 and the second clamping piece 73 extend in the Y direction.

In this example, the body portion 71B, the first clamping piece 72, and the second clamping piece 73 are integrally molded using resin. The first clamping piece 72 projects to the divided member 70A side from a position on the body portion 71B closer to the lower surface of the body portion 71B. The second clamping piece 73 projects to the divided member 70A side from a position on the body portion 71B closer to the upper surface of the body portion 71B.

The first clamping piece 72 and the second clamping piece 73 face one another in the thickness direction of the body portion 71B, overlapping in a plan view of the divided member 70B. Between the first clamping piece 72 and the second clamping piece 73, a gap T2 equal to or greater than a thickness dimension T1 of the connection piece 74 is formed. Then, with the connection piece 74 disposed between the first clamping piece 72 and the second clamping piece 73, the divided members 70A and 70B are connected. Accordingly, within the range in which the connection piece 74 can move between the first clamping piece 72 and the second clamping piece 73, excessive drooping that would obstruct assembly can be suppressed, and the divided members 70A and 70B can swing in the thickness direction of the rigid member 250.

A lock piece 75 is provided on one of the divided members 70A and 70B, and a receiving recess portion 76 is provided in the other. In the present embodiment, the lock piece 75 is provided on the divided member 70B, and the receiving recess portion 76 is provided in the divided member 70A. Alternatively, the receiving recess portion 76 may be provided in the divided member 70B including the pair of clamping pieces 72 and 73, and the lock piece 75 may be provided on the divided member 70A including the connection piece 74.

The lock piece 75 has a shape including a distal end portion of an elongated portion provided with a lock projection portion 75a. The lock projection portion 75a, for example, is formed in a shape including a portion that gradually decreases in the projection dimension as it extends toward the distal end portion of the lock piece 75. The surface of the lock projection portion 75a that faces the base end side of the lock piece 75 may be a surface orthogonal to the extension direction of the lock piece 75.

The lock piece 75 is provided between the first clamping piece 72 and the second clamping piece 73. In this example, a pair of the lock pieces 75 are provided on both ends in the extension direction of the first clamping piece 72 and the second clamping piece 73. The lock piece 75 projects between the first clamping piece 72 and the second clamping piece 73 at the side surface of the body portion 71B facing the divided member 70A. The lock projection portion 75a projects outward in the extension direction of the first clamping piece 72 and the second clamping piece 73 between the first clamping piece 72 and the second clamping piece 73.

The receiving recess portion 76 is formed in the connection piece 74 of the divided member 70A. Specifically, the receiving recess portion 76 is formed in both end portions of the connection piece 74 in the long side direction. In this example, a blind hole portion 76a with a rectangular shape is formed extending from the end portion of the connection piece 74 on the divided member 70B side toward the body portion 71A. The receiving recess portion 76 is formed at the bottom of the blind hole portion 76a. The blind hole portion 76a is formed with a size and depth that allows the lock piece 75 to be inserted. The receiving recess portion 76 is formed in a shape recessed (opening outward in this example) from the side surface at the bottom of the blind hole portion 76a. The receiving recess portion 76 is formed with a size that allows the lock projection portion 75a to be disposed. The receiving recess portion 76 is set with a size that allows movement of the lock projection portion 75a in the thickness direction of the divided members 70A and 70B and the toward and away direction. Specifically, a dimension L2 of the receiving recess portion 76 is greater than a dimension L1 of the lock projection portion 75a in a toward and away direction E (arrangement direction of the divided members 70A and 70B) of the divided members 70A and 70B. Accordingly, the lock projection portion 75a can move inside the receiving recess portion 76 in a direction E. Also, a dimension M2 of the receiving recess portion 76 is greater than a dimension M1 of the lock projection portion 75a in the thickness direction of the divided members 70A and 70B. Accordingly, the lock projection portion 75a can also move inside the receiving recess portion 76 in the thickness direction of the divided members 70A and 70B.

Note that in the present embodiment, the receiving recess portion 76 is formed in the connection piece 74, but this is not necessarily so. A projection piece formed separate from the connection piece 74 may be formed and provided with a receiving recess portion.

Also, the divided member 70A is provided with an assisting piece 77 that can come into contact with the outer surface of at least one of the first clamping piece 72 and the second clamping piece 73. In this example, the assisting piece 77 is provided on a portion located on the opposite side of the first clamping piece 72 from the connection piece 74, which is a surface of the body portion 71A that faces the divided member 70B side. The assisting piece 77 is integrally molded with the body portion 71A using resin.

A gap greater than the thickness dimension of the first clamping piece 72 is formed between the connection piece 74 and the assisting piece 77. Accordingly, the first clamping piece 72 can move in the thickness direction of the divided members 70A and 70B in the space between the connection piece 74 and the assisting piece 77. However, the divided member 70B is supported by the divided member 70A, and thus, with the lock projection portion 75a in contact with the lower edge in the receiving recess portion 76, the assisting piece 77 is in contact with the outward-facing surface (down-facing surface) of the first clamping piece 72. Accordingly, when the divided members 70A and 70B move relative to one another, the load of the divided member 70B is distributed and received not only by the lock projection portion 75a and the receiving recess portion 76 but also by the assisting piece 77. This makes separating the divided members 70A and 70B difficult.

The projection length of the assisting piece 77 from the side surface of the body portion 71A is preferably set to a smaller length than the projection length of the connection piece 74. Accordingly, the divided members 70A and 70B can move relative to one another without hindrance from the assisting piece 77.

According to the rigid member 250, the connection piece 74 is disposed between the first clamping piece 72 and the second clamping piece 73, and the pair of lock pieces 75 are inserted in the blind hole portions 76a. Then, the lock projection portion 75a comes into contact with the outer side surface inside the blind hole portion 76a, and the lock piece 75 elastically deforms. When the lock projection portion 75a reaches the receiving recess portion 76, the lock piece 75 returns to its original shape, and the lock projection portion 75a fits into the receiving recess portion 76.

In this state, the lock projection portion 75a can move inside the receiving recess portion 76, and, in the range of movement for the connection piece 74 between the first clamping piece 72 and the second clamping piece 73, the divided members 70A and 70B can move relative to one another in the thickness direction F of the divided members 70A and 70B and the toward and away direction E of the divided members 70A and 70B. Also, at both ends of the connection piece 74, the lock projection portion 75a can move in the direction E inside the receiving recess portion 76. Thus, the lock projection portion 75a can be located near to the body portion 71A on one end side of the connection piece 74 and the lock projection portion 75a can be located away from the body portion 71A or vice versa. As a result, the divided members 70A and 70B can swing relative to one another in the front-and-back direction G of the vehicle 10.

Figure 19:
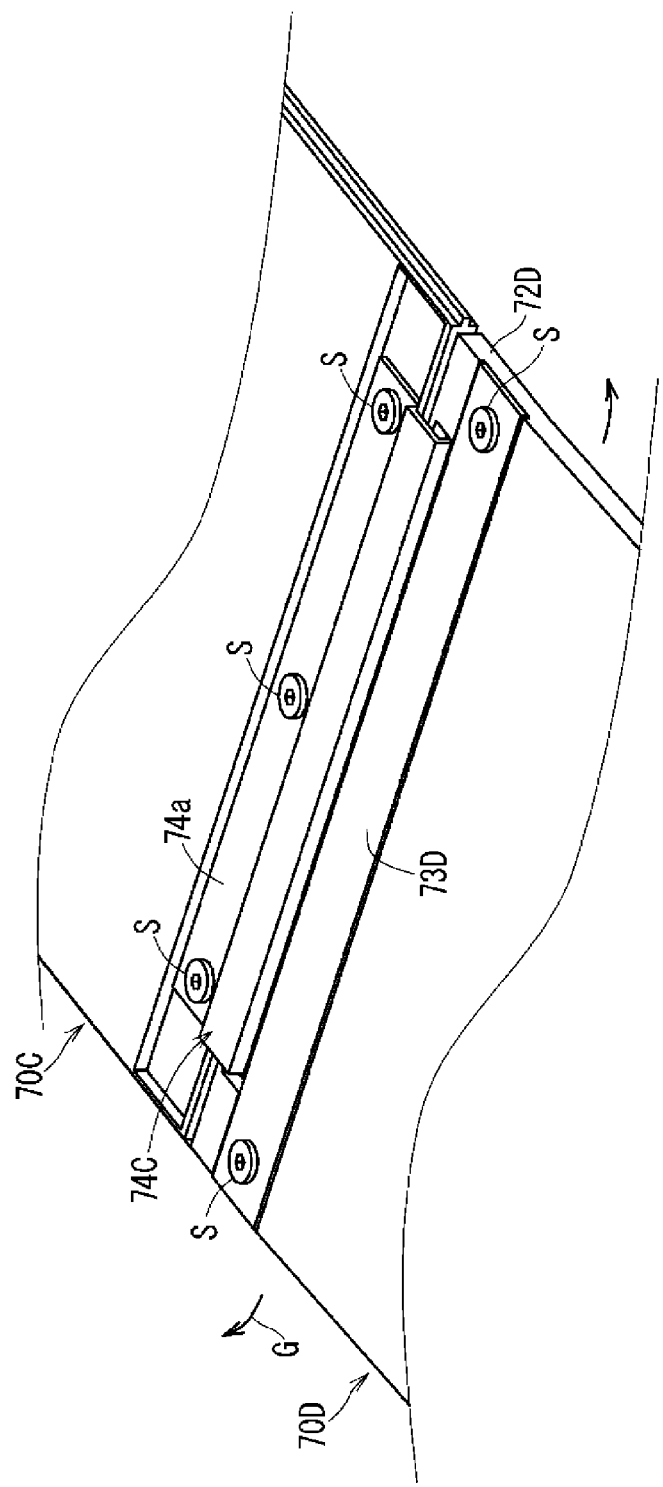
FIG. 19 is a partial enlarged perspective view illustrating a modified example of the connection structure of the plurality of divided members.
Figure 20:
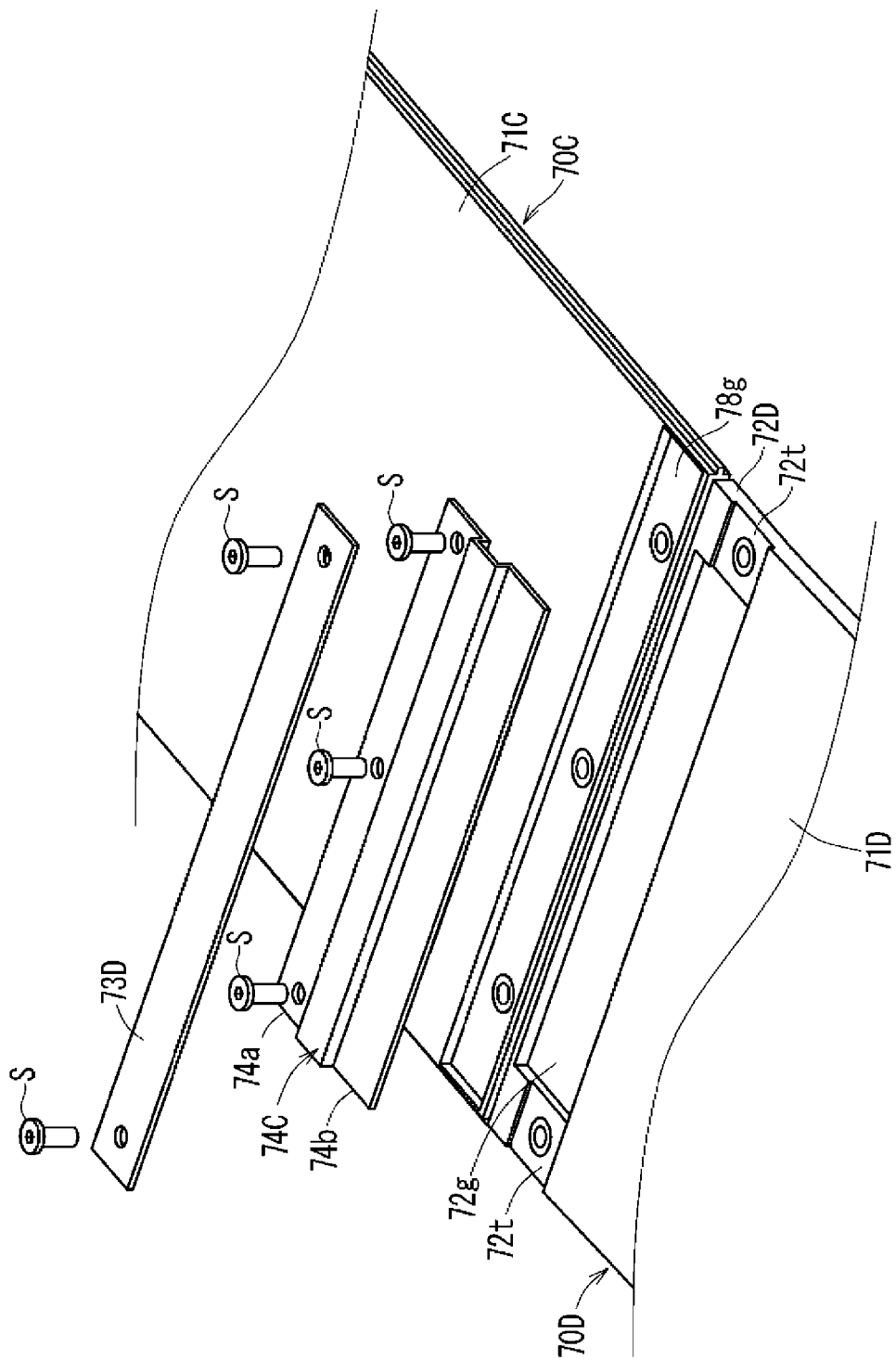
FIG. 20 is a partial exploded perspective view illustrating the modified example of the connection structure of the plurality of divided members.
Figure 21:
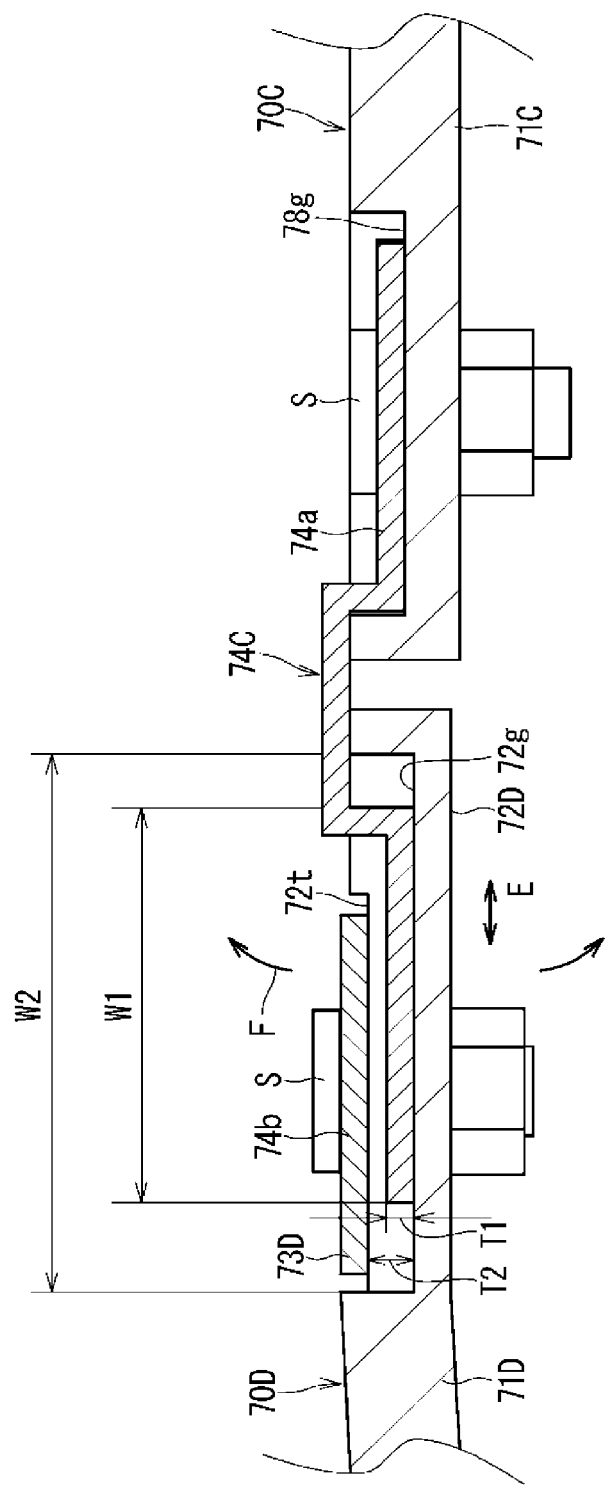
FIG. 21 is a cross-sectional view illustrating the modified example of the connection structure of the plurality of divided members.

FIG. 19 is a partial enlarged perspective view illustrating a modified example of the connection structure of the plurality of divided members 70. FIG. 20 is a partial exploded perspective view illustrating the modified example of the connection structure of the plurality of divided members 70. FIG. 21 is a cross-sectional view illustrating the modified example of the connection structure of the plurality of divided members 70. In the description, one of the two connected divided members 70 is referred to as a divided member 70C and the other as 70D.

The divided member 70C includes a body portion 71C extending in a plate-like shape and a connection piece 74C. The connection piece 74C is attached to the edge portion of the body portion 71C on the divided member 70D side. The connection piece 74C extends toward the divided member 70D side.

The divided member 70D includes a body portion 71D extending in a plate-like shape, a first clamping piece 72D, and a second clamping piece 73D. The first clamping piece 72D and the second clamping piece 73D are provided on the edge portion of the body portion 71D on the divided member 70C side. The first clamping piece 72D and the second clamping piece 73D face one another in the thickness direction of the body portion 71D, overlapping in a plan view of the divided member 70D. Between the first clamping piece 72D and the second clamping piece 73D, the gap T2 equal to or greater than the thickness dimension T1 of the connection piece 74C is formed. Then, with the connection piece 74C disposed between the first clamping piece 72D and the second clamping piece 73D, the divided members 70C and 70D are connected. Accordingly, within the range in which the connection piece 74C can move between the first clamping piece 72D and the second clamping piece 73D, excessive drooping that would obstruct assembly can be suppressed, and the divided members 70C and 70D can swing in the thickness direction of a rigid member 250A.

Specifically, in the divided member 70C described above, the body portion 71C and the connection piece 74C are formed separately. For example, the body portion 71C may be formed using resin, and the connection piece 74C may be formed using metal. The connection piece 74C may be formed using resin. The connection piece 74C is attached projecting outward from the side portion of the body portion 71C. In the present embodiment, an elongated recessed groove portion 78g is formed along the side portion of one surface (the upper surface) of the body portion 71C on the divided member 70D side. An attachment-side portion 74a of the connection piece 74C on the side that is attached to the body portion 71C is formed with a shape projecting, via a step portion, in a central region of the connection piece 74C in the width direction. Also, the attachment-side portion 74a is fixed, using screws S, to the bottom portion of the recessed groove portion 78g with the attachment-side portion 74a disposed inside the recessed groove portion 78g in contact with the bottom surface of the recessed groove portion 78g.

The attachment configuration of the connection piece 74C and the body portion 71C is not limited to the example described above, and a rivet fixing structure or a weld fixing structure may be used instead. Also, the connection piece 74C and the body portion 71C are not necessarily separate bodies, and the connection piece 74C and the body portion 71C may be integrally molded using resin.

The side portion of the connection piece 74C on the divided member 70D side is formed on a side protrusion portion 74b projecting toward one surface (lower surface side) of the connection piece 74C, via a step portion, in a central region of the connection piece 74C in the width direction. The side protrusion portion 74b extends along the boundary between the divided members 70C and 70D.

The first clamping piece 72D on the divided member 70D side is an elongated portion extending along the side portion of the body portion 71D on the divided member 70C side. In this example, the body portion 71D and the first clamping piece 72D are integrally molded using resin.

A recessed groove portion 72g that extends along the boundary between the divided members 70C and 70D is formed in the first clamping piece 72D. The recessed groove portion 72g is an elongated groove extending along the boundary described above. The planar size of the recessed groove portion 72g is set to a larger size than the side protrusion portion 74b described above. For example, in the toward and away direction of the divided members 70C and 70D (arrangement direction of the divided members 70C and 70D), a width W2 of the recessed groove portion 72g is greater than a width W1 of the side protrusion portion 74b. Also, for example, in the direction of the boundary between the divided members 70C and 70D, the length of the recessed groove portion 72g is greater than the length of the side protrusion portion 74b. The side protrusion portion 74b may be housed in the recessed groove portion 72g. With the side protrusion portion 74b housed in the recessed groove portion 72g, the side protrusion portion 74b can move inside the recessed groove portion 72g an amount corresponding to the size of the play described above.

A pair of supporting protrusion portions 72t projecting beyond the bottom surface of the recessed groove portion 72g are formed on both outer ends of the recessed groove portion 72g in the long side direction. The periphery of the recessed groove portion 72g on four sides is surrounded by wall surfaces. The projection length of the supporting protrusion portions 72t from the bottom surface of the recessed groove portion 72g is greater than the thickness dimension T1 of the connection piece 74C. In this example, a recess portion that the end portion 14a of the connection piece 74C can fit into is formed in the supporting protrusion portions 72t, and the height of the bottom surface of the recess portion from the bottom surface of the recessed groove portion 72g corresponds to the projection length of the supporting protrusion portions 72t. The dimension T2 of the gap described above may be set depending on the projection length.

The second clamping piece 73D is formed separately from the body portion 71D. The second clamping piece 73D may be a metal plate, for example. The second clamping piece 73D is formed in a rectangular plate-like shape that is longer than the recessed groove portion 72g described above. With both end portions of the second clamping piece 73D in contact with the supporting protrusion portions 72t, the second clamping piece 73D is attached to the first clamping piece 72D at a certain position. For example, with both end portions of the second clamping piece 73D overlapping the pair of supporting protrusion portions 72t, the end portions of the second clamping piece 73D are screwed to the supporting protrusion portions 72t via the screws S. These portions may be fixed using rivets or the like instead.

By attaching the second clamping piece 73D to the first clamping piece 72D with the side protrusion portion 74b housed in the recessed groove portion 72g described above, the side protrusion portion 74b of the connection piece 74C is interposed between the first clamping piece 72D and the second clamping piece 73D. In this state, the second clamping piece 73D is on the opposite side of the connection piece 74C to the first clamping piece 72D, and the side protrusion portion 74b is housed inside the recessed groove portion 72g.

Since the second clamping piece 73D is in contact with the supporting protrusion portions 72t described above, a gap with the dimension T2 described above that depends on the projection length of the supporting protrusion portions 72t is ensured between the bottom of the recessed groove portion 72g and the second clamping piece 73D. Accordingly, within the range in which the connection piece 74C can move between the first clamping piece 72D and the second clamping piece 73D, the divided members 70C and 70D can swing in the thickness direction F thereof. Also, the side protrusion portion 74b can move inside the wall surfaces surrounding the recessed groove portion 72g in four directions. For example, in the arrangement direction of the divided members 70C and 70D, the width W2 of the recessed groove portion 72g is greater than the width W1 of the side protrusion portion 74b. Since the side protrusion portion 74b can move inside the recessed groove portion 72g this amount, the divided members 70C and 70D can move relative to one another in the toward and away direction E. Also, the side protrusion portion 74b can move such that the portions thereof at both ends in the long side direction of the recessed groove portion 72g move in different directions. For example, movement with one end portion of the side protrusion portion 74b being shifted to the body portion 71D side inside the recessed groove portion 72g and the other end portion of the side protrusion portion 74b being shifted in the direction away from the body portion 71D inside the recessed groove portion 72g can be performed as well as the opposite movement. Accordingly, the divided members 70C and 70D can move relative to one another, such as swinging the front-and-back direction G of the vehicle 10.

Other Modified Examples

In the examples described above, as the plurality of device fixing portions 52, the plurality of fixing holes 53 are formed, but such a configuration is not required. For example, as the plurality of device fixing portions 52, a plurality of protrusion portions may be provided.

Also, in the examples described above, the rigid member 50 includes the wiring line holding portion 54, but such a configuration is not required. In the rigid member 50, the portion holding the transmission member 40 may be a simple flat surface. In this case, the transmission member 40 may be fixed to the rigid member 50 by an adhesive, adhesive tape, or the like. Also, the transmission member 40 may be provided with a clip, and the clip may be fixed to the open portion of a fixing hole. Also, even when the wiring line holding portion 54 is provided, the configuration of the wiring line holding portion 54 is not limited to the examples described above. For example, as the wiring line housing portion 55, the second housing portion 57 may be omitted and only the first housing portion 56 may be provided.

Also, in the examples described above, the arrangement space is the space inside the roof, but such a configuration is not required. The arrangement space of the wiring module 20 may be the space between a door panel, which is the vehicle body panel 13, and a door trim, which is the interior member 16, or the like.

Also, in the examples described above, the vehicle body panel 13 is provided with the panel-side wiring line holding portion 15, but such a configuration is not required. The vehicle body panel 13 may not be provided with the panel-side wiring line holding portion 15. In this case, the portion of the transmission member 40 extending outside the rigid member 50 may be supported on the interior member 16. Also, even when the vehicle body panel 13 is provided with the panel-side wiring line holding portion 15, the configuration of the panel-side wiring line holding portion 15 is not limited to the examples described above. For example, the holding portion 15b may be a hole that can secure a clip or the like provided on the transmission member 40.

Also, in the example of the first embodiment, the portions of the transmission members 40 of the plurality of wiring modules 20 extending outside the rigid member 50 may be bundled into one bundle in advance by a binding member such as tape, a binding band, or the like before being held by the panel-side wiring line holding portion 15. In this case, this can be considered as one wiring module 20 being provided with the plurality of rigid members 50. In other words, the wiring module 20 is provided with the plurality of rigid members 50, and the transmission members 40 extending from the plurality of rigid members 50 may be bundled into one bundle. This makes handling the transmission members 40 extending from the plurality of rigid members 50 easy.

Note that the configurations described in the embodiments and the modified examples can be appropriately combined with one another in a non-contradictory manner.

LIST OF REFERENCE NUMERALS

10 Vehicle
11 Roof portion
12 Body
13 Roof panel (vehicle body panel)
14 Receiving portion
14a End portion
14b Intermediate portion
14c Through hole
15 Panel-side wiring line holding portion
15a Fixing portion
15b Holding portion
15c Recess portion
16 Roof liner (interior member)
17, 17D Duct
18A, 18B, 18C Duct-side flow path
19A, 19B, 19C Outlet
20, 120, 120A, 120B, 120C Wiring module
30, 130A Device
31, 131A Housing
31a Housing-side inlet (first through hole)
31b Housing-side outlet (second through hole)
32 Fixing piece
33 Fixing hole
34 Interval adjustment member
35 Fixing hole
36 Heat dissipation portion
37 Heat transfer member
38 Heat sink 40 Transmission member
50, 150, 150A, 150B, 150C, 150D, 250, 250A Rigid member
52 Device fixing portion
53 Fixing hole
54 Wiring line holding portion
55 Wiring line housing portion
56 First housing portion
57 Second housing portion
58, 59 Projection
60 Panel fixing portion
61 Through hole
62 Flow path
63 Inlet
64 Outlet
65 Exposure hole
66 Recess portion
67 Divider
70, 70A, 70B, 70C, 70D Divided member
71A, 71B, 71C, 71D Body portion
72, 72D First clamping piece
72g Recessed groove portion
72t Supporting protrusion portion
73, 73D Second clamping piece
74, 74C Connection piece
74a Attachment side portion
74b Side protrusion portion
75 Lock piece
75a Lock projection portion
76 Receiving recess portion
76a Blind hole portion
77 Assisting piece
78g Recessed groove portion
80 Tube-shaped member
100 Panel with wiring module
S Screw

What is claimed is:

1. A wiring module disposed in a vehicle in an arrangement space between a vehicle body panel and an interior portion, comprising:
  at least one device;
  a transmission portion extending from each one of the at least one device; and
  a plurality of rigid portions each including a panel fixing portion and a plurality of device fixing portions, wherein
  each one of the at least one device is fixed to a device fixing portion selected from the plurality of device fixing portions,
  a portion of the transmission portion extending out from each one of the at least one device is held by the plurality of rigid portions, and
  the plurality of rigid portions are separately fixed to the vehicle body panel via the panel fixing portion of each rigid portion such that the wiring module is fixed to the vehicle body panel via the panel fixing portion.

2. The wiring module according to claim 1, wherein
  as the plurality of device fixing portions, a plurality of fixing holes are formed in a surface of the rigid portion, and
  each one of the at least one device is fixed using a set of fixing holes selected from among the plurality of fixing holes.

3. The wiring module according to claim 1, wherein
  the rigid portion includes a wiring line holding portion that holds the transmission portion, and
  the wiring line holding portion includes a wiring line housing portion formed as a groove in the surface of the rigid portion that houses the transmission portion and a projection for stopping the transmission portion from coming out from the wiring line housing portion.

4. The wiring module according to claim 1, wherein
  the arrangement space is a space inside a roof between a roof panel, which is the vehicle body panel, and a roof liner, which is the interior portion.

5. The wiring module according to claim 1, wherein
  the transmission portions extending from the plurality of rigid portions are bundled into one bundle.

6. A panel with wiring module, comprising:
  the wiring module according to claim 1; and
  the vehicle body panel, wherein
  the vehicle body panel includes a receiving portion where the panel fixing portion of the rigid portion is fixed and a panel-side wiring line holding portion that holds a portion of the transmission portion that extends outside the rigid portion.

7. The panel with wiring module according to claim 6, wherein
  a plurality of the wiring modules, the receiving portions, and the panel-side wiring line holding portions are provided on the single vehicle body panel, and
  the transmission portions of the plurality of wiring modules are collectively held by at least one of the plurality of panel-side wiring line holding portions.

8. The wiring module according to claim 1, wherein
  as the panel fixing portion, a first through hole is defined through each rigid portion at a position corresponding to a second through hole of the vehicle body panel, and
  the wiring module is fixed to the vehicle body panel with a screw extending through the first and second through holes.

9. The wiring module according to claim 1, wherein
  each of the plurality of rigid portions further includes a wiring line holding portion that holds the transmission portion, and
  the wiring line holding portion includes:
    a first housing portion extending in a first direction and provided between the panel fixing portion and the plurality of device fixing portions; and
    a second housing portion extending, in a second direction that intersects the first direction, from the first housing portion toward the device fixing portions.

* * * * *